US012750806B2

(12) United States Patent
Nguyen et al.

(10) Patent No.: US 12,750,806 B2
(45) Date of Patent: Sep. 29, 2026

(54) LOCATION-BASED SIDELINK CONFIGURATION

(71) Applicant: QUALCOMM Incorporated, San Diego, CA (US)

(72) Inventors: Tien Viet Nguyen, Bridgewater, NJ (US); Dan Vassilovski, Del Mar, CA (US); Kapil Gulati, Belle Mead, NJ (US)

( * ) Notice: Subject to any disclaimer, the term of this patent is extended or adjusted under 35 U.S.C. 154(b) by 292 days.

(21) Appl. No.: 18/400,764

(22) Filed: Dec. 29, 2023

(65) Prior Publication Data

US 2025/0220619 A1 Jul. 3, 2025

(51) Int. Cl.

| | |
|---|---|
| ***H04W 64/00*** | (2009.01) |
| ***H04W 76/10*** | (2018.01) |
| *H04W 80/02* | (2009.01) |
| *H04W 92/18* | (2009.01) |

(52) U.S. Cl.
CPC ........... *H04W 64/00* (2013.01); *H04W 76/10* (2018.02); *H04W 80/02* (2013.01); *H04W 92/18* (2013.01)

(58) Field of Classification Search
CPC ..... H04W 64/00; H04W 76/10; H04W 80/02; H04W 92/18
See application file for complete search history.

(56) References Cited

U.S. PATENT DOCUMENTS

2023/0354470 A1* 11/2023 Chae ................. H04W 52/0216
2024/0163909 A1* 5/2024 Li ......................... H04W 72/25

* cited by examiner

*Primary Examiner* — Tuan H Nguyen

(57) ABSTRACT

Various aspects of the present disclosure generally relate to wireless communication. In some aspects, a first user equipment (UE) may establish a sidelink with a second UE using at least a set of reference sidelink configuration parameters. The UE may update the sidelink using a set of location-based delta sidelink configuration parameters that are based at least in part on a sidelink location that includes at least one of: a first location of the first UE, or a second location of the second UE. Numerous other aspects are described.

20 Claims, 8 Drawing Sheets

LOCATION-BASED SIDELINK CONFIGURATION

FIELD OF THE DISCLOSURE

Aspects of the present disclosure generally relate to wireless communication and specifically relate to techniques, apparatuses, and methods for location-based sidelink configuration.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a first user equipment (UE). The method may include establishing a sidelink with a second UE using at least a set of reference sidelink configuration parameters. The method may include updating the sidelink using a set of location-based delta sidelink configuration parameters that are based at least in part on a sidelink location that includes at least one of: a first location of the first UE, or a second location of the second UE.

Some aspects described herein relate to an apparatus for wireless communication at a first UE. The apparatus may include one or more memories and one or more processors coupled to the one or more memories. The one or more processors may be configured to establish a sidelink with a second UE using at least a set of reference sidelink configuration parameters. The one or more processors may be configured to update the sidelink using a set of location-based delta sidelink configuration parameters that are based at least in part on a sidelink location that includes at least one of: a first location of the first UE, or a second location of the second UE.

Some aspects described herein relate to a non-transitory computer-readable medium that stores a set of instructions for wireless communication by a first UE. The set of instructions, when executed by one or more processors of the UE, may cause the UE to establish a sidelink with a second UE using at least a set of reference sidelink configuration parameters. The set of instructions, when executed by one or more processors of the UE, may cause the UE to update the sidelink using a set of location-based delta sidelink configuration parameters that are based at least in part on a sidelink location that includes at least one of: a first location of the first UE, or a second location of the second UE.

Some aspects described herein relate to an apparatus for wireless communication. The apparatus may include means for establishing a sidelink with a second UE using at least a set of reference sidelink configuration parameters. The apparatus may include means for updating the sidelink using a set of location-based delta sidelink configuration parameters that are based at least in part on a sidelink location that includes at least one of: a first location of the first UE, or a second location of the second UE.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
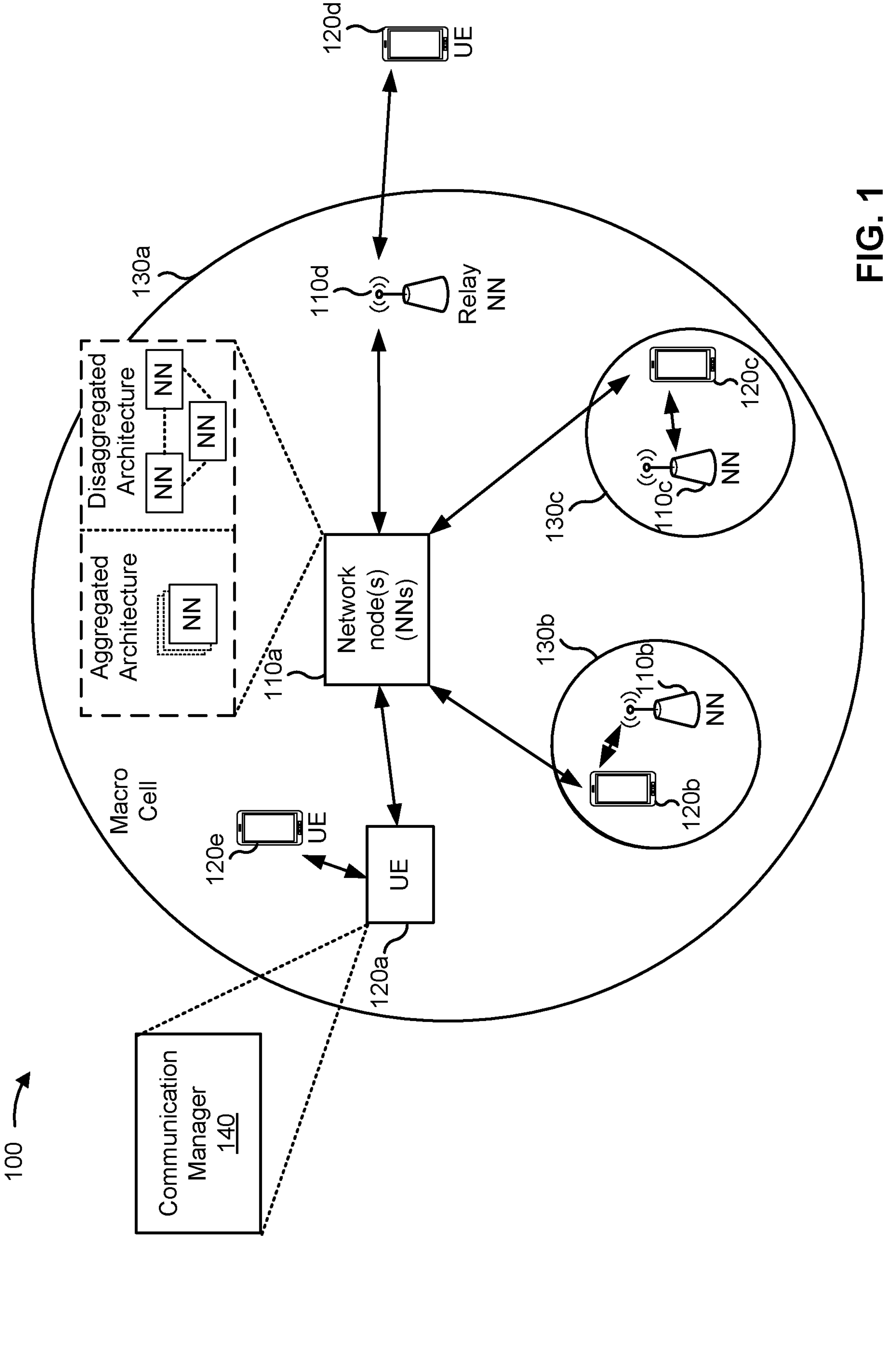
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A communication standard may specify and/or describe one or more operations that are used by a network node and/or a user equipment (UE) to enable sidelink communications between a first UE and a second UE. Accordingly, UEs that are configured to support the communication standard may follow the descriptions and/or specifications of the communication standard. In some aspects, the communication standard may specify one or more parameters that control and/or configure the operations. The parameter(s) may be preconfigured at a factory (e.g., programmed into memory of a UE during a manufacturing process) and/or may be configured at the UE by a network node. The UE may establish a sidelink, and/or communicate with another UE via the sidelink, using parameter(s) that are preconfigured (e.g., as part of a manufacturing process and/or by a network node).

The use of preconfigured parameter(s) in wireless communications may lead to sub-optimal operations that result in inefficient usage of air interface resources and/or reduced signal quality (e.g., a reduced power level and/or increased interference). To illustrate, the preconfigured parameter(s) may be less efficient for particular channel conditions and/or a particular operating location relative to parameters that are configured for the particular channel conditions and/or the particular operating location. Although a network node may provide some reconfiguration of factory-installed parameters, operating conditions in a coverage area provided by the network node 110 may vary in different locations based at least in part on a size of the coverage area. For example, the network node may indicate a same parameter value to a first UE operating at a first location in the coverage area and a second UE operating at a second location in the coverage area. Based at least in part on a size of the coverage area, the first UE and the second UE may observe different operating conditions at the different locations, and the reconfiguration of a parameter by the network node may also result in inefficient use of air interface resources, as described above. Inefficient air interface resource usage may result in reduced data throughput and/or increased data transfer latencies in a wireless network. Alternatively, or additionally, a reduced signal quality may result in increased recovery errors.

Various aspects relate generally to location-based sidelink configuration. Some aspects more specifically relate to the use of delta and/or differential sidelink configuration parameters that may provide flexibility to tailor a sidelink configuration to a particular operating environment. In some aspects, a first UE may establish a sidelink with a second UE using at least a set of reference sidelink configuration parameters. The set of reference sidelink configuration parameters, for example, may be a set of absolute sidelink configuration parameters and/or a set of baseline sidelink configuration parameters. In some aspects, the first UE may update the sidelink and/or communication via the sidelink using a set of location-based delta sidelink configuration parameters, such as a set of location-based delta sidelink configuration parameters that are configured for a particular location and/or a particular operating condition. In some aspects, the set of location-based delta sidelink configuration parameters may be based at least in part on a sidelink location that may be a first location of the first UE and/or a second location of the second UE. Accordingly, the set of location-based delta sidelink configuration parameters may be used to modify the set of reference sidelink configuration parameters to a more optimal configuration that improves an efficiency of sidelink communications (e.g., reduces air interface resource consumption).

Particular aspects of the subject matter described in this disclosure can be implemented to realize one or more of the following potential advantages. In some examples, by using a set of reference sidelink configuration parameters and a set of location-based delta sidelink configuration parameters in combination, the described techniques can be used to provide more flexible configuration of a sidelink that results in a more efficient sidelink, relative to using factory-installed parameters and/or network node configured parameters (e.g., that are not tailored to an operating location and/or a current channel condition). To illustrate, a set of reference sidelink configuration parameters and/or a set of baseline sidelink configuration parameters may ensure interoperability of a sidelink between devices, and updating the set of reference sidelink configuration parameters using a set of location-based delta sidelink configuration parameters may optimize network performance to improve signal quality, reduce recovery errors, reduce air interface resource usage, and/or increase data throughput.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHZ), FR4a or FR4-1 (52.6 GHz through 71 GHZ), FR4 (52.6 GHz through 114.25 GHz), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., a UE 120) may include a communication manager 140. As described in more detail elsewhere herein, the communication manager 140 may establish a sidelink with a second UE using at least a set of reference sidelink configuration parameters; and update the sidelink using a set of location-based delta sidelink configuration parameters that are based at least in part on a sidelink location that includes at least one of: a first location of the first UE, or a second location of the second UE. Additionally, or alternatively, the communication manager 140 may perform one or more other operations described herein.

As indicated above, FIG. 1 is provided as an example. Other examples may differ from what is described with regard to FIG. 1.

Figure 2:
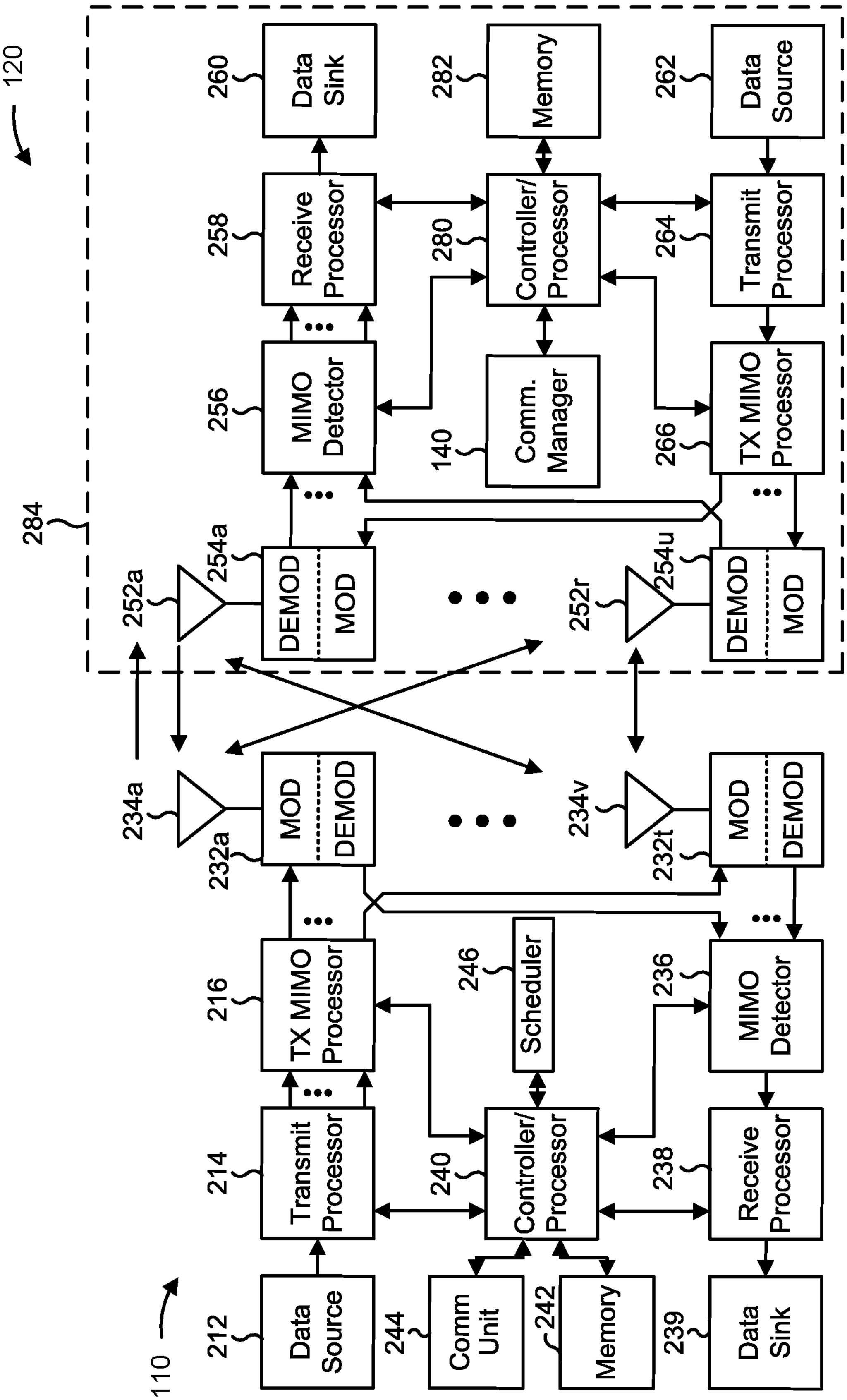
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where $t \geq 1$), a set of antennas 234 (shown as 234*a* through 234*v*, where $v \geq 1$), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems **254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120**) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
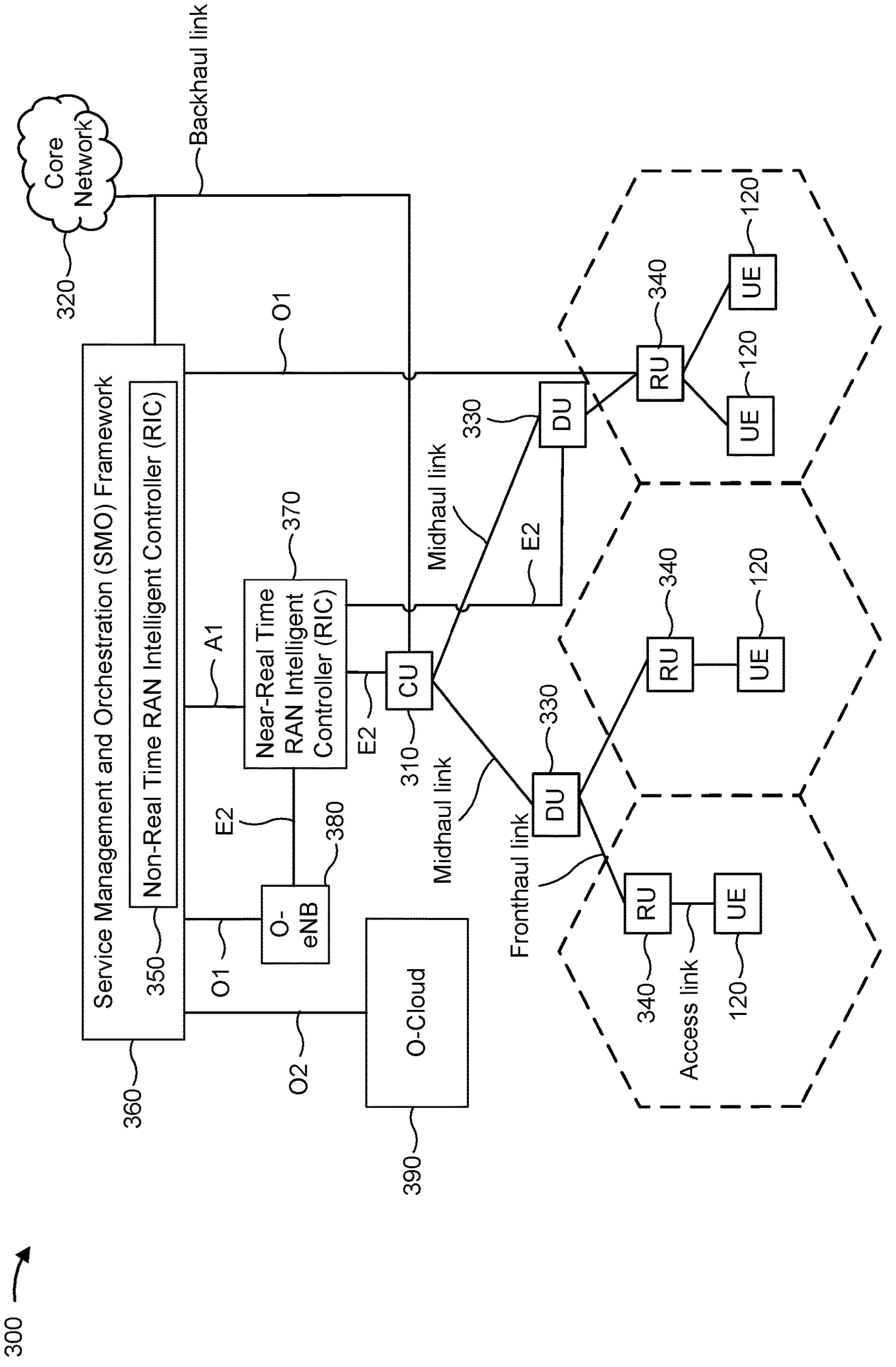
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with location-based sidelink configuration, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, or other processes as described herein. In some examples, executing instructions may include running the instructions, converting the instructions, compiling the instructions, and/or interpreting the instructions, among other examples.

In some aspects, a UE (e.g., a UE 230) may be a first UE that includes means for establishing a sidelink with a second UE using at least a set of reference sidelink configuration parameters; and/or means for updating the sidelink using a set of location-based delta sidelink configuration parameters that are based at least in part on a sidelink location that includes at least one of: a first location of the first UE, or a second location of the second UE. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
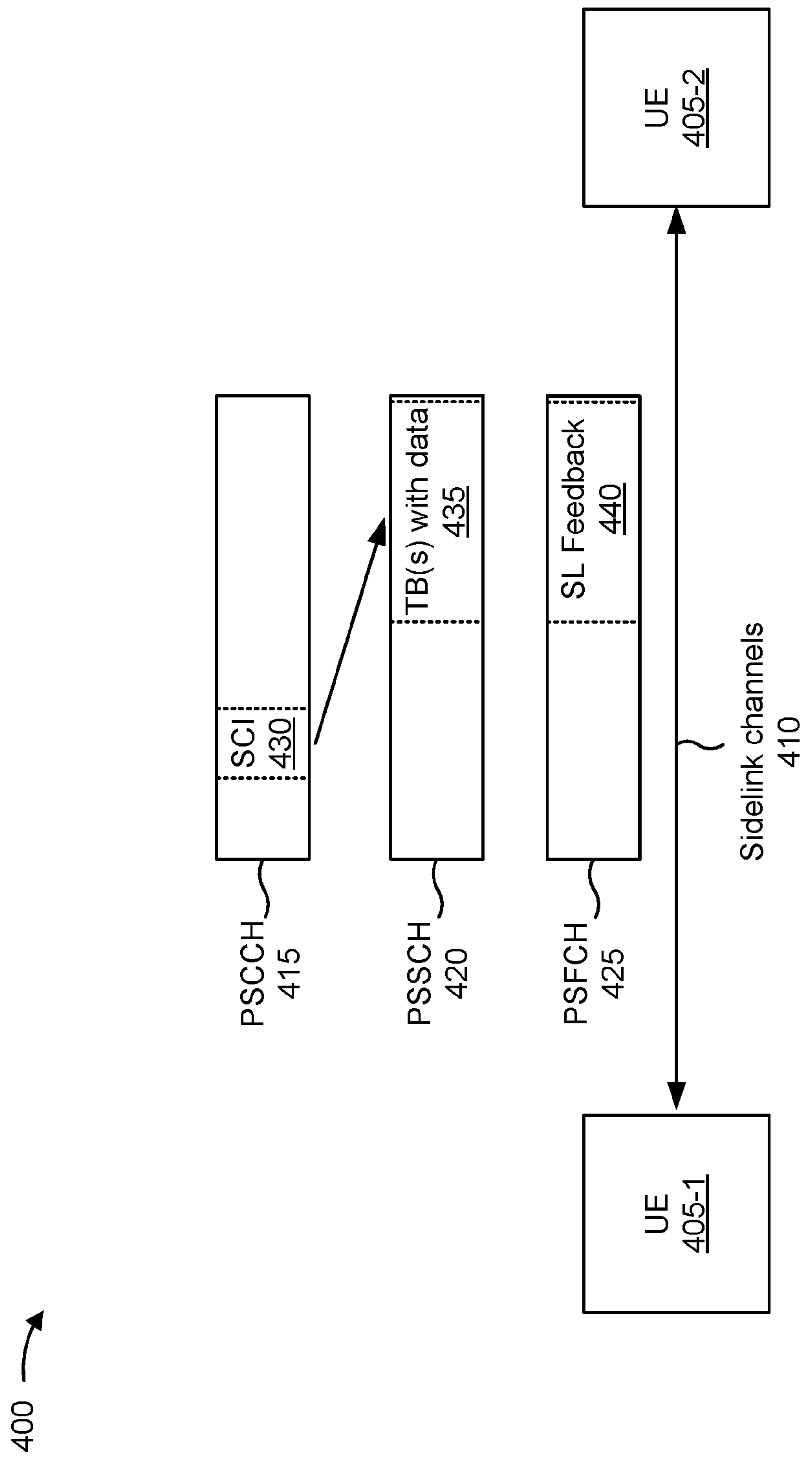
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a PSCCH 415, a PSSCH 420, and/or a PSFCH 425. The PSCCH 415 may be used to communicate control information, similar to PDCCH and/or a PUCCH used for cellular communications with a network node 110 via an access link or an access channel. The PSSCH 420 may be used to communicate data, similar to a PDSCH and/or a PUSCH used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement (ACK) or negative acknowledgement (NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in DCI or in an RRC message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
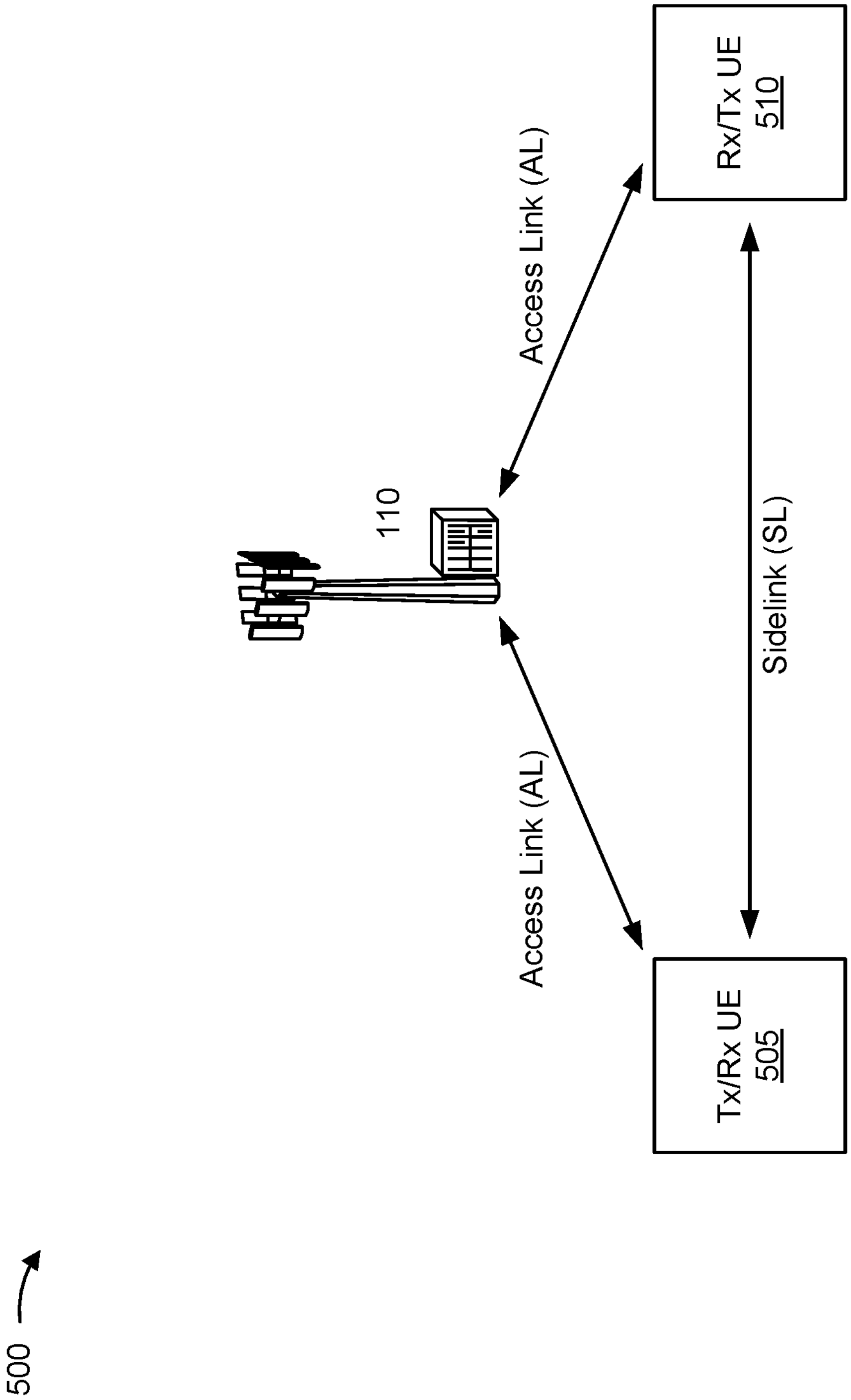
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

A communication standard may specify and/or describe one or more operations that are used by a network node 110 and/or a UE 120 to enable sidelink communications between a first UE and a second UE. For example, the communication standard may specify how a network node 110 may facilitate Mode 1 communications between UEs in a sidelink and/or how UEs may use Mode 2 communications to communicate using a sidelink. Accordingly, UEs that are configured to support the communication standard may follow the descriptions and/or specifications of the communication standard. That is, the UEs may implement the Mode 1 communications and/or the Mode 2 communications as indicated by the communication standard. Alternatively, or additionally, the communication standard may specify one or more parameters that control and/or configure the operations. In some aspects, the parameter(s) may be preconfigured at a factory (e.g., programmed into memory of a UE 120 during a manufacturing process) and/or may be configured by a network node 110. For example, a manufacturing process may program one or more "golden parameters" into the UE 120 that are used for sidelink communications. "Golden parameter" may denote a parameter that is set to a default, ideal, and/or optimal value that may be used (e.g., by a UE 120) for consistent operation. In some aspects, one or more parameters may be configured by a network node 110. To illustrate, the network node 110 may indicate (e.g., via an RRC configuration message and/or an RRC reconfiguration message) a value that is used by the UE 120 to configure and/or reconfigure a parameter. According, a first UE and a second UE may communicate via a sidelink using one or more parameters that are preconfigured and/or set as part of manufacturing a UE and/or one or more parameters that are preconfigured by network node 110.

The use of preconfigured parameters in wireless communications, such as parameters that are used to establish a sidelink and/or communicate using the sidelink, may lead to sub-optimal operations that use air interface resources inefficiently and/or reduce a signal quality (e.g., a reduced power level and/or increased interference). That is, a "one size fits all" configuration (e.g., golden parameters, preconfigured parameters from a network node, and/or parameters that are not set based at least in part on an operating condition of a UE) may be less efficient for particular channel conditions and/or a particular operating location relative to parameters that are configured for the particular channel conditions and/or the particular operating location. Inefficient air interface resource usage may result in reduced data throughput and/or increased data transfer latencies in a wireless network. Alternatively, or additionally, a reduced signal quality may result in increased recovery errors.

In some aspects, a network node 110 may provide some reconfiguration of factory-installed parameters and/or golden parameters. However, operating conditions in a coverage area provided by the network node 110 may vary in different locations based at least in part on a size of the coverage area, and the network node 110 may indicate a same parameter value to a first UE operating at a first location in the coverage area and a second UE operating at a second location in the coverage area. Based at least in part on a size of the coverage area, the first UE and the second UE may observe different operating conditions at the different locations, and the reconfiguration of a parameter by the network node 110 (e.g., using a same value for the first UE and the second UE) may also result in inefficient use of air interface resources as described above. Alternatively, or additionally, the network node 110 may transmit the parameter value using RRC messaging (e.g., Layer 3 (L3) signaling) that increases a signaling overhead relative to Layer 1 (L1) and/or Layer 1 (L2) signaling. To illustrate, in V2X communications, a network node 110 may establish a respective communication link to each vehicle and transmit a respective RRC message to each vehicle separately as respective unicast messages. The network node 110 transmitting reconfiguration information may also introduce a dependency between a network operator and sidelink communications (e.g., V2X communications). That is, in order to support the pre-configuration of operating parameters and/or the reconfiguration of factory-installed parameters used by V2x communication, a network operator may be obligated to deploy serving cells that provide coverage to V2X network areas, and/or a V2X device may be dependent on the network operator deploying the serving cells. Accordingly, a "one size fits all" configuration of a parameter and/or reconfiguration of a parameter to different UEs without the consideration of a respective operating condition for each UE may result in sub-optimal configurations that lead to inefficient use of air interface resources, reduced signal quality, increased data transfer latencies, reduced data throughput in a wireless network (e.g., a sidelink), increased recovery errors, and/or a dependency on network nodes for sidelink operations.

Some techniques and apparatuses described herein provide location-based sidelink configuration. A first UE may establish a sidelink with a second UE using at least a set of reference sidelink configuration parameters. The set of reference sidelink configuration parameters, for example, may be a set of absolute sidelink configuration parameters and/or a set of baseline sidelink configuration parameters. In some aspects, the first UE may update the sidelink and/or communication via the sidelink using a set of location-based delta sidelink configuration parameters, such as a set of location-based delta sidelink configuration parameters that are configured for a particular location and/or a particular operating condition. In some aspects, the set of location-based delta sidelink configuration parameters may be based at least in part on a sidelink location that may be a first location of the first UE and/or a second location of the second UE. Accordingly, the set of location-based delta sidelink configuration parameters may be used to modify the set of reference sidelink configuration parameters to a more optimal configuration that improves an efficiency of sidelink communications (e.g., reduces air interface resource consumption).

In combination, the set of reference sidelink configuration parameters and the set of location-based delta sidelink configuration parameters may provide a more efficient sidelink configuration and/or a more efficient sidelink communication configuration relative to using factory-installed parameters and/or network node configured parameters that are not tailored to an operating location and/or a current channel condition (e.g., "one size fits all" parameters). To illustrate, a set of reference sidelink configuration parameters and/or a set of baseline sidelink configuration parameters may ensure interoperability of a sidelink between devices, and updating the set of reference sidelink configuration parameters using a set of location-based delta sidelink configuration parameters may optimize network performance (e.g., improve signal quality, reduce recovery errors, reduce air interface resource usage, and/or increase data throughput) based at least in part on an operating location (e.g., a vehicle location) of the device(s) using the sidelink. Example parameters that may be updated to optimize network performance may include a congestion control parameter, a resource selection threshold parameter, a pre-emption parameter (e.g., enable and/or disable pre-emption), and/or a sidelink synchronization signal (SLSS) parameter that configures an SLSS procedure. Accordingly, the use of location-based delta sidelink configuration parameter(s) may provide dynamic optimization of a sidelink configuration in a localized manner that improves a sidelink efficiency. A more efficient sidelink configuration and/or a more efficient sidelink communication configuration may result in reduced air interface resource consumption, increased data throughput, and/or reduced data transfer latencies. Alternatively, or additionally, using the set of reference sidelink configuration parameters in combination with the set of location-based delta sidelink configuration parameters may improve a signal quality (e.g., reduced interference, increased power level), resulting in decreased recovery errors and/or an increased operating range.

As indicated above, FIG. 5 is provided as an example. Other examples may differ from what is described with respect to FIG. 5.

Figure 6:
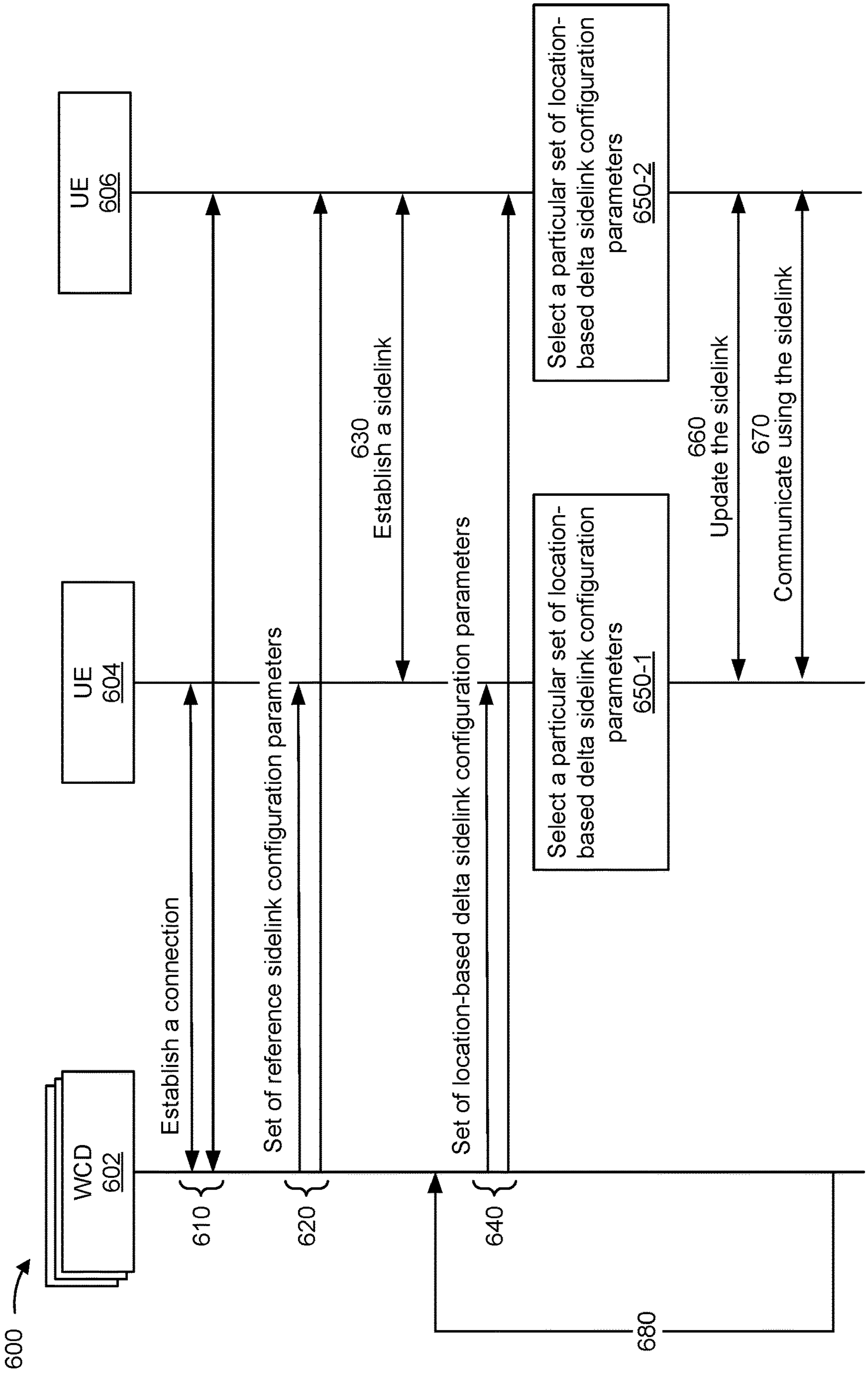
FIG. 6 is a diagram illustrating an example of a wireless communication process between a wireless communication device, a first UE, and a second UE, in accordance with the present disclosure.

FIG. 6 is a diagram illustrating an example 600 of a wireless communication process between a wireless communication device (WCD) 602, a first UE 604 (e.g., a first UE 120), and a second UE 606 (e.g., a second UE 120), in accordance with the present disclosure. As shown by FIG. 6, the WCD 602 may include multiple WCDs, and the multiple WCDs may include one or more network nodes 110 and/or one or more roadside units (RSUs). In some aspects, the signaling transactions of the WCD 602 that are shown by FIG. 6 may be performed by different WCDs. For instance, a first signaling transaction performed by the WCD 602 may be a first WCD that is implemented as a network node 110, and a second signaling transaction performed by the WCD 602 may be a second WCD that is implemented as an RSU. An RSU may be a WCD that enables communication between UEs (e.g., the first UE 604 and the second UE 606) and/or between a UE and infrastructure (e.g., a V2X UE, a V2X infrastructure, and/or a wireless network). For instance, an RSU may enable communication between a mobile UE (e.g., a V2X vehicle) and a wireless network (e.g., a 5G network), such as by establishing a sidelink to the mobile UE and/or an access link to a network node 110. Alternatively, or additionally, an RSU may provide information to a UE, such as traffic conditions, traffic controls, and/or location-based information (e.g., a set of location-based delta configuration parameters), using the sidelink and/or using a connectionless communication. "Connectionless" may denote a protocol used by two devices to wirelessly exchange information without establishing a dedicated end-to-end connection.

As shown by reference number 610, a WCD 602 (e.g., a network node 110 and/or an RSU) may establish a first connection with a first UE 604. Alternatively, or additionally, the WCD 602 may establish a second connection with a second UE 606. In some aspects, the first UE 604 and the second UE 606 may establish the respective connections to a same WCD (e.g., a same network node 110 and/or a same RSU), while in other aspects, the first UE 604 and the second UE 606 may establish respective connections to different WCDs. For instance, the first UE 604 may establish the first connection to a first network node 110 and/or a first RSU, and the second UE 606 may establish the second connection to a second network node 110 and/or a second RSU.

To illustrate, the first UE 604 and/or the second UE 606 may power up in a cell coverage area provided by the WCD 602 (e.g., a network node 110), and the first UE 604 and/or the second UE 606 may perform one or more procedures (e.g., a random access channel (RACH) procedure and/or an RRC procedure) to establish a wireless connection with the WCD 602. As another example, the first UE 604 and/or the second UE 606 may move into the cell coverage area provided by the WCD 602 and may perform a handover from a source WCD (e.g., a source network node 110) to the WCD 602 (e.g., a target network node 110). Alternatively, or additionally, the first UE 604 and/or the second UE 60 may move to a location that is within communication range of the WCD 602 (e.g., an RSU), and the WCD 602 may broadcast information that is received and/or decoded by the first UE 604 and the second UE 606. Accordingly, in some aspects, the first connection and/or the second connection may include receiving and/or decoding broadcast information. However, in other examples, the first UE 604 and/or the second UE 606 may not establish a connection to the WCD 602, such as in scenarios that include connectionless communications.

In some aspects, the WCD 602 may communicate with the first UE 604 via the first connection and/or the second UE 606 via the second connection based at least in part on any combination of Layer 1 signaling (e.g., DCI) and/or uplink control information (UCI)), Layer 2 signaling (e.g., a MAC control element (CE)), and/or Layer 3 signaling (e.g., RRC signaling). To illustrate, the WCD 602 may request, via RRC signaling, UE capability information and/or the UE 120 may transmit, via RRC signaling, the UE capability information. As part of communicating via the connection, the WCD 602 may transmit configuration information, such as a configuration of one or more connectionless groupcast NACK feedback zone(s) that may be used by a receiving UE to determine whether to transmit NACK feedback.

In some aspects, the WCD 602 may transmit the configuration information in multiple messages, such as by transmitting multiple potential configurations via Layer 3 signaling (e.g., RRC signaling), and activating and/or deactivating a particular configuration via Layer 2 signaling (e.g., a MAC CE) and/or Layer 1 signaling (e.g., DCI). To illustrate, the WCD 602 may transmit the configuration information via Layer 3 signaling at a first point in time associated with the first UE 604 and/or the second UE 606 being tolerant of communication delays, and the WCD 602 may transmit an activation of the configuration via Layer 2 signaling and/or Layer 1 signaling at a second point in time associated with the first UE 604 and/or the second UE 606, respectively, being intolerant to communication delays.

As shown by reference number 620, the WCD 602 may transmit, and the first UE 604 may receive, a set of reference sidelink configuration parameters. Alternatively, or additionally, the WCD 602 may transmit, and the second UE 606 may receive, a set of reference sidelink configuration parameters. In some aspects, the WCD 602 may transmit a single set of reference sidelink configuration parameters, while in other aspects, the WCD 602 may transmit multiple sets of reference sidelink configuration parameters. Although FIG. 6 illustrates the WCD 602 transmitting the set of reference sidelink configuration parameters, other examples may include the first UE 604 and/or the second UE 606 obtaining the set of reference sidelink configuration parameters that are local and/or stored in memory (e.g., as factory-installed absolute reference sidelink configuration parameters and/or factory-installed baseline sidelink reference sidelink configuration parameters). In some aspects, the set of reference sidelink configuration parameters and/or the multiple sets of reference sidelink configuration parameters may be RRC configured. That is, the WCD 602 may transmit the set of reference sidelink configuration parameters and/or the multiple sets of reference sidelink configuration parameters in an RRC message.

As shown by reference number 630, the first UE 604 and the second UE 606 may establish a sidelink as described with regard to FIG. 4 and FIG. 5. Alternatively, or additionally, the first UE 604 and the second UE 606 may communicate via the connection based at least in part on any combination of Layer 1 signaling (e.g., SCI), Layer 2 signaling (e.g., a MAC CE), and/or Layer 3 signaling (e.g., RRC signaling). To illustrate, the first UE 604 may request, via RRC signaling, UE capability information, and the second UE 606 may transmit, via RRC signaling, the UE capability information (or vice versa). Alternatively, or additionally, the first UE 604 and/or the second UE 606 may autonomously transmit the UE capability information (e.g., without receiving a request for the UE capability information). As part of communicating via the connection, the first UE 604 and/or the second UE 606 may transmit configuration information via Layer 3 signaling (e.g., RRC signaling), and activate and/or deactivate a particular configuration via Layer 2 signaling (e.g., a MAC CE) and/or Layer 1 signaling (e.g., SCI). For clarity, FIG. 6 illustrates the first UE 604 establishing a single sidelink with the second UE 606, but in other examples, the first UE 604 may establish multiple sidelinks with multiple UEs and/or multiple sidelinks with the second UE 606.

As shown by reference number 640, a WCD 602 may transmit, and the first UE 604 may receive, a set of location-based delta sidelink configuration parameters. Alternatively, or additionally, a WCD 602 may transmit, and the second UE 606 may receive, a set of location-based delta sidelink configuration parameters. As described above, the WCD 602 shown by FIG. 6 may include multiple WCDs and/or different types of WCDs. Accordingly, in some aspects, a first WCD 602 that transmits the set of reference sidelink configuration parameters as described with regard to reference number 630 may be different from a second WCD 602 that transmits the set of location-based delta sidelink configuration parameters as described with regard to reference number 640. To illustrate, the first WCD 602 may be a network node 110 and the second WCD 602 may be an RSU. However, the first WCD 602 and the second WCD 602 may be other combinations of a network node 110 and/or an RSU in other examples (e.g., a first network node 110 and a second network node 110, a first RSU and a second RSU, and/or an RSU and a network node 110, respectively). The first UE 604 and the second UE 606 may receive the set of location-based delta sidelink confirmations from a same WCD (e.g., a same network node 110 and/or a same RSU) or from different WCDs (e.g., different network nodes and/or different RSUs). Alternatively, or additionally, the first UE 604 and the second UE 606 may receive a same set of location-based delta sidelink configuration parameters and/or different sets of location-based delta sidelink configuration parameters from one another.

As one example, the first UE 604 and/or the second UE 606 may establish a first sidelink with one another, and a respective second sidelink with a second WCD 602 that is an RSU (e.g., a same RSU and/or different RSUs) Accordingly, the first UE 604 and/or the second UE 606 may receive the set of location-based delta sidelink configuration parameters via the respective second sidelink and/or configure the first sidelink using the set of location-based delta sidelink configuration parameters as described below. As another example, the first UE 604 and/or the second UE 606 may establish a sidelink with one another, and a respective access link with a second WCD 602 that is a network node 110 (e.g., a base station). Accordingly, the first UE 604 and/or the second UE 606 may receive the set of location-based delta sidelink configuration parameters via the respective access link and/or configure the first sidelink using the set of location-based delta sidelink configuration parameters as described below. As yet another example, the first UE 604 may establish an access link with a WCD in the form of a network node, and the second UE 606 may establish a second sidelink with an RSU (for vice versa), and/or may receive the set of location-based delta sidelink configuration parameters via the access link and/or second sidelink, respectively. In some aspects, the first UE 604 and/or the second UE 606 may use the set of location-based delta sidelink configuration parameters to configure multiple sidelinks (e.g., with respective UEs and/or with one another).

The WCD 602 may transmit the set of location-based delta sidelink configuration parameters using any combination of Layer 1 signaling, Layer 2 signaling, and/or Layer 3 signaling. As one example, the WCD 602 may transmit the set of location-based sidelink delta configuration parameters in a MAC CE (e.g., a configuration message in the MAC CE), and the set of location-based sidelink delta configuration parameters may include one or more RRC configuration updates (e.g., updates to the RRC configured set of reference sidelink configuration parameters). The set of location-based delta sidelink configuration parameters may include and/or indicate an update to one or more parameters included in the set of reference sidelink configuration parameters, such as an update to any combination of a congestion control parameter, a resource selection threshold parameter, a pre-emption parameter, and/or an SLSS parameter that configures an SLSS procedure. Accordingly, the set of location-based sidelink delta configuration parameters may indicate one or more updates to an RRC configured sidelink (e.g., configured via the set of reference sidelink configuration parameters).

The WCD 602 may transmit multiple sets of location-based delta sidelink configuration parameters using any combination of Layer 1 signaling, Layer 2 signaling, and/or Layer 3 signaling. As one example, the WCD 602 may transmit the multiple sets of location-based delta sidelink configuration parameters in the MAC CE, and the first UE 604 and/or the second UE 606 may select a particular set of location-based delta sidelink configuration parameters from the multiple sets as described below with regard to reference number 650-1 and reference number 650-2. In some aspects, the WCD 602 may indicate the multiple sets of location-based delta sidelink configuration parameters in a configuration message that is included in the MAC CE. Alternatively, or additionally, the WCD 602 may indicate, via the configuration message and/or the MAC CE, a respective coverage zone for each set of location-based delta sidelink configuration parameters.

To further explain, a coverage area that is provided by a network node 110 may be partitioned into sub-coverage areas and/or coverage zones (e.g., partitioned regions of the coverage area). As part of the configuration message, the WCD 602 may indicate a respective coverage zone for each set of location-based delta sidelink configuration parameters. As one example, each respective coverage zone may be referenced by a respective center location (e.g., an actual center location within the respective coverage zone, an approximate center location within the respective coverage zone, and/or an assigned center location within the respective coverage zone). For instance, the WCD 602 may indicate a respective center location for each respective set of location-based delta sidelink configuration parameters by indicating the respective center location using one or more Cartesian coordinates (e.g., x-y coordinates of the center location).

A size and/or shape of a coverage zone may be implicit. To illustrate, and as described above, multiple sets of location-based delta sidelink configuration parameters may be linked to a respective coverage zone. In some aspects, all coverage zones indicated in a configuration message (e.g., a configuration message in a MAC CE) have a same size and/or a same shape. That is, the inclusion of a coverage zone in the configuration message may implicitly indicate that the coverage zone has a same size and/or same shape as the other coverage zones indicated in the configuration message. The size and/or shape that is common to the coverage zones may be specified by a communication standard, specified by a network operator, and/or may be indicated in the configuration message. For instance, the configuration message may indicate a single size and/or single shape that is applicable to all coverage zones indicated in the configuration messages.

Alternatively, or additionally, the configuration message may dynamically indicate one or more characteristics for the coverage zones (e.g., implicitly and/or explicitly). The ability to dynamically indicate a size and/or shape for each coverage zone may enable the WCD 602 to select a signaling format that balances a trade-off between an amount of overhead signaling that is used to indicate the size and/or shape with a configuration flexibility. To illustrate, the configuration message may indicate a single size and/or a single shape for a coverage zone, and the indication of a single size and/or single shape may imply that each coverage zone has a same size and/or same shape as described above. Alternatively, or additionally, the configuration message may indicate a respective size and/or a respective shape for each coverage zone. The indication of a single size and/or a single shape may reduce signaling overhead to the indication of a respective size and/or respective shape for each coverage zone. However, the indication of a respective size and/or respective shape for each coverage zone may increase a flexibility in how a coverage area is partitioned into coverage zones relative to using a same size and/or same shape for each coverage zone.

In some aspects, the WCD 602 may not signal a size and/or shape for the coverage zone(s). For instance, the WCD 602 may signal a center location as described above, and a size and/or shape of each coverage zone may be based at least in part on a Voronoi cell. "Voronoi cell" may denote a cell partitioning and/or coverage area partitioning that is based at least in part on a set of base points (e.g., seeds). Each region and/or partition of the Voronoi cell (e.g., a coverage zone) may be specified as a region of the cell in which all points within the region are closer the respective base point and/or seed than to any other base point and/or seed in the set. Accordingly, the size and/or shape of each coverage zone may be based at least in part on an indicated center location and the use of a Voronoi cell to characterize a shape and/or a size of a coverage zone.

A coverage zone may be based at least in part on a connectionless groupcast NACK feedback zone. For instance, and as described above with regard to reference number 610, the WCD 602 may signal a zone configuration for one or more connectionless groupcast NACK feedback zones, and may reuse the connectionless groupcast NACK feedback zones in the configuration message. That is, the WCD 602 may indicate, as a coverage zone, a connectionless groupcast NACK feedback zone for each set of location-based delta sidelink configuration parameters. Accordingly, the configuration message may link each set of location-based delta sidelink configuration parameters to a respective connectionless groupcast NACK feedback zone.

In some aspects, each set of location-based delta sidelink configuration parameters in the multiple sets of location-based delta sidelink configuration parameters may be different from one another and/or unique within the multiple sets of location-based delta sidelink configuration parameters. To illustrate, neighboring coverage zones may share a same configuration parameter and/or a same set of configuration parameters. Based at least in part on neighboring coverage zones sharing a same configuration parameter, a first number of uniquely different sets of location-based delta configuration parameters may be fewer than a second number of coverage zones. That is, a coverage area may include N coverage zones, the multiple sets of location-based delta sidelink configuration parameters may include M uniquely different sets of location-based delta configuration parameters, and N may be greater than M based at least in part on multiple coverage zones being assigned and/or linked to a same set of location-based delta configuration parameters (N and M being integers). Accordingly, the WCD 602 may transmit, via the configuration message, a list of uniquely different sets of location-based delta configuration parameters, and each set of location-based delta configuration parameters may be assigned a configuration index. Alternatively, or additionally, the WCD 602 may indicate (e.g., in the configuration message and/or the MAC CE) a respective configuration index for each operating zone that links the respective set of location-based delta sidelink configuration parameters to an operating zone, and a configuration index may be linked to multiple operating zones such that a set of location-based delta configuration parameters may be associated with multiple operating zones. For example, the configuration message may indicate a center location of an operating zone and associate the center location with a configuration index. By transmitting unique sets of location-based delta sidelink configuration parameters, the WCD 602 may reduce a size of the configuration, eliminate the transmission of redundant sets, and preserve air interface resources.

In some aspects, the unique sets of location-based delta sidelink configuration parameters may differ from one another only by a few parameters (e.g., four or fewer parameters). For example, a first set of location-based delta sidelink configuration parameters and a second set of location-based delta sidelink configuration parameters may each include 10 parameters, and the first set of location-based delta parameters may only differ from the second set of location-based delta parameters by a single parameter. That is, nine of the parameters are the same and/or commensurate (e.g., within a threshold of one another), and one of the parameters differs between the two sets by more than the threshold. Accordingly, the WCD 602 may indicate one or more sets of reference location-based delta sidelink configuration parameters (e.g., that are updates to, and/or differences that are relative to, a set of reference sidelink configuration parameters) and/or may indicate one or more sets of differential location-based delta sidelink configuration parameters. To illustrate, and with regard to the first set of location-based delta configuration parameters and the second set of location-based delta configuration parameters that differ by a single parameter, the WCD 602 may indicate, as a set of reference location-based delta sidelink configuration parameters, the first set of location-based delta sidelink configuration parameters. For the second set of location-based delta sidelink configuration parameters, the WCD 602 may indicate a set of differential location-based delta sidelink configuration parameters that includes a single parameter: the single parameter of the second set of location-based delta sidelink configuration parameters that differs from the first set of location-based delta sidelink configuration parameters.

As an example, the WCD 602 may indicate, in the configuration message (e.g., via the MAC CE), multiple uniquely different sets of reference location-based delta sidelink configuration parameters that are reference and/or baseline sets of location-based delta sidelink configuration parameters. Each set of reference location-based delta sidelink configuration parameters may be assigned an index (e.g., a reference delta configuration index) that is indicated in the configuration message. Alternatively, or additionally, the WCD 602 may indicate a difference to a set of reference location-based delta sidelink configuration parameter using one or more sets of differential location-based delta sidelink configuration parameters. For example, the WCD 602 may link a set of differential location-based delta sidelink configuration parameters to a set of reference location-based delta sidelink configuration parameters, such as by indicating (e.g., in the configuration message) a reference delta configuration index with a set of differential location-based delta sidelink configuration parameters. Alternatively, or additionally, each set of differential location-based delta sidelink configuration parameters may be linked to a coverage zone. According, a UE (e.g., the first UE 604 and/or the second UE 606) may derive a set of location-based delta configuration parameters based at least in part on a combination of a set of reference location-based delta configuration parameters (e.g., indicated by the reference delta configuration index) and a set of differential location-based delta configuration parameters. By using the combination of a set of reference location-based delta configuration parameters and a set of differential location-based delta configuration parameters to indicate a set of location-based delta configuration parameters, the WCD 602 may reduce the transmission of redundant information and, consequently, reduce signaling overhead (e.g., a number of air interface resources) that is used to indicate location-based delta configuration parameter(s). For instance, the WCD 602 may transmit, in the configuration message, a list of one or more sets of reference location-based delta configuration parameters that are each assigned a respective reference delta configuration index, and one or more sets of differential location-based delta configuration parameters (e.g., by referencing a reference delta configuration index and/or by indicating the differential configuration parameters) to indicate multiple sets of location-based delta configuration parameters by reducing the transmission of redundant parameters.

The WCD 602 may format the configuration message using a data serialization format that reduces and/or comprises an amount of data included in the configuration message. For example, the WCD 602 may use a binary JavaScript Object Notation (BSON) data serialization format to compress the configuration message and reduce signaling overhead that is used to transmit the configuration message. Alternatively, or additionally, the WCD 602 may codify one or more parameter names (e.g., a name of a differential location-based delta configuration parameter) to reduce and/or compress an amount of data included in the configuration message. As one example, two (2) bytes may be used to represent and/or convey 65536 different variables, while a string representation of the variable name uses more data than 2 bytes.

In some aspects, the first UE 604 and/or the second UE 606 may receive multiple transmissions, and each transmission may originate from a respective transmission source (e.g., a respective WCD 602). Each transmission may indicate a respective set (and/or multiple sets) of location-based sidelink configuration parameters and/or a respective origination location of the transmission, such as a location and/or coverage zone of the respective WCD 602. To illustrate, each transmission may indicate an origin location in a MAC CE included in the transmission. Alternatively, or additionally, each transmission may indicate a respective priority that is associated with the transmission (e.g., a QoS priority value). That is, the priority may indicate that the transmission includes a set of location-based delta configuration parameters that are designed to configure a sidelink to achieve the priority. As described with regard to reference number 650-1 and/or reference number 650-2, the first UE 604 and/or the second UE 606 may select a particular transmission from the multiple transmissions, such as by selecting a particular transmission that has a strongest signal strength out of the multiple transmissions and/or by selecting a particular transmission that has a highest priority out of the multiple transmissions, and may obtain a set of location-based delta sidelink configuration parameters from the particular transmission.

As described above, the WCD 602 may transmit a configuration message (e.g., via a MAC CE) that includes any combination of one or more sets of location-based delta sidelink configuration parameters, one or more sets of reference location-based delta sidelink configuration parameters, one or more sets of differential location-based delta sidelink configuration parameters, parameter name(s), and/or indices. Alternatively, or additionally, the WCD 602 may transmit the configuration message in application layer traffic. That is, the WCD 602 may transmit any combination of one or more sets of location-based delta sidelink configuration parameters, one or more sets of reference location-based delta sidelink configuration parameters, one or more sets of differential location-based delta sidelink configuration parameters, parameter name(s), and/or indices in application layer traffic. Transmitting the configuration message in application layer traffic may provide additional flexibility to update and/or modify the configuration message as new functionalities in a wireless network evolve.

As shown by reference number 650-1, the first UE 604 may select a particular set of location-based delta sidelink configuration parameters. Alternatively, or additionally, as shown by reference 650-2, the second UE 606 may select a particular set of location-based delta sidelink configuration parameters. To illustrate, and as described above, the first UE 604 and/or the second UE 606 may receive multiple sets of location-based delta sidelink configuration parameters in a configuration message from a WCD 602, and each set of location-based delta sidelink configuration parameters may be linked to a respective coverage zone. The coverage zone may, in some cases, be based at least in part on a connectionless groupcast NACK feedback zone. The first UE 604 and/or the second UE 606 may select a particular set of location-based delta sidelink configuration parameters from the multiple sets of location-based delta sidelink configuration parameters using a sidelink location (e.g., a location of the first UE 604 and/or a location of the second UE 606) and the coverage area.

As one example, the first UE 604 and/or the second UE 606 may compare a respective center location of each respective coverage zone to the sidelink location, and may select, as the particular set of location-based delta sidelink configuration parameters, the set of location-based delta sidelink configuration parameters that is linked to the respective coverage zone that is closest to the sidelink location. Alternatively, or additionally, the first UE 604 and/or the second UE 606 may compare a respective connectionless groupcast NACK feedback zone assigned to the UE to each coverage zone, and may select, as the particular set of location-based delta sidelink configuration parameters, the set of location-based delta sidelink configuration parameters that is linked to the respective coverage zone that is closest to the respective connectionless groupcast NACK feedback zone that is assigned to the UE. The first UE 604 and/or the second UE 606 may receive a configuration of the respective connectionless groupcast NACK feedback zone (s) from a WCD 602 as described above, such as in an RRC message and/or in RRC parameters (e.g., Layer 3 signaling).

As described above with regard to reference number 640, the first UE 604 and/or the second UE 606 may receive multiple transmissions, and each transmission may originate from a different transmission source (e.g., different WCDs). In some aspects, one or more of the transmissions may indicate a respective priority, and the first UE 604 and/or the second UE 606 may select a particular transmission from the multiple transmissions that indicates a highest priority. Alternatively, or additionally, the first UE 604 and/or the second UE 606 may calculate a respective signal strength metric (e.g., RSRP and/or RSSI) for each respective transmission, and may select, as the particular transmission, the transmission that has the highest signal strength metric out of the multiple transmissions and/or the transmission that satisfies a signal strength criterion.

In some aspects, each transmission may carry a respective MAC CE that indicates a coverage zone associated with the transmission (e.g., a coverage zone that the transmitting device is located in and/or an origination location), and the first UE 604 and/or the second UE 606 may select, as the particular transmission, the transmission that indicates a coverage zone that satisfies a distance condition, such as a first distance condition that a coverage zone indicated by the transmission is a same coverage zone as the UE (e.g., the first UE 604 and/or the second UE 606), a second distance condition that the coverage zone satisfies a distance threshold to the sidelink location, and/or a third distance condition that the transmission is closest to the sidelink location (e.g., a location of the first UE 604 and/or a location of the second UE 606) relative to the other transmissions. The first UE 604 and/or the second UE 606 may determine whether the coverage zone satisfies the distance condition using the sidelink location. In some aspects, a priority indicated by the transmission may take precedence over a distance condition being satisfied and/or a signal strength. To illustrate, a first transmission that indicates a first priority may be closer to the first UE 604 relative to a second transmission that indicates a second priority that is higher than the first priority. In some aspects, the first UE 604 may select the second transmission based at least in part on the second priority being higher in priority than the first priority.

Based at least in part on the selection (e.g., via any combination of priority, location, and/or signal strength), the first UE 604 and/or the second UE 606 may recover information from the particular transmission to obtain a set of location-based delta sidelink configuration parameters, such as by obtaining the set of location-based delta sidelink configuration parameters from a MAC CE carried in the particular transmission and/or from application layer data carried by the particular transmission. In some aspects, obtaining the set of location-based delta sidelink configuration parameters may include obtaining a set of reference location-based delta sidelink configuration parameters and/or a set of differential location-based delta sidelink configuration parameters. For instance, the first UE 604 and/or the second UE 606 may select a set of differential location-based delta sidelink configuration parameters based at least in part on a coverage area linked to the set of differential location-based delta sidelink configuration parameters being a same coverage area that includes the sidelink location. The first UE 604 and/or the second UE 606 may then use a delta configuration index that is linked to the differential location-based delta sidelink configuration parameters to obtain and/or locate a set of reference location-based delta sidelink configuration parameters that arise baseline for the set of differential location-based delta sidelink configuration parameters.

While the example 600 includes the first UE 604 and the second UE 606 each selecting a respective set of reference sidelink parameters, other examples may include the first UE 604 and/or the second UE 606 not selecting a respective set of reference sidelink parameters. To illustrate, the WCD 602 may transmit a single set of location-based delta sidelink configuration parameters and/or may indicate a selection to the first UE 604 and/or the second UE 606. Alternatively, or additionally, the first UE 604 and/or the second UE 606 may receive a single transmission that includes a single set of location-based delta sidelink configuration parameters, and the first UE 604 and/or the second UE 606 may select the single set of location-based delta sidelink configuration parameters.

As shown by reference number 660, the first UE 604 and/or the second UE 606 may update the sidelink configuration using the set of location-based delta sidelink configuration parameters. To illustrate, the first UE 604 and/or the second UE 606 may update the sidelink configuration using any combination of a congestion control parameter, a resource selection threshold parameter, a pre-emption parameter, and/or an SLSS parameter. For clarity, FIG. 6 illustrates the first UE 604 and/or the second UE 606 updating a single sidelink configuration for a single sidelink, but in other examples the first UE 604 and/or the second UE 606 may update multiple sidelink configurations for multiple sidelinks (e.g., with one or more other UEs and/or with one another) using the set of location-based delta sidelink configuration parameters. For example, the first UE 604 may update a second sidelink configuration for a second sidelink with a third UE and/or a third sidelink configuration for a third sidelink with a fourth UE using the set of location-based delta sidelink configuration parameters.

As shown by reference number 670, the first UE 604 and/or the second UE 606 may communicate using the updated sidelink. To illustrate, the first UE 604 may transmit, and the second UE 606 may receive, a first communication using the updated sidelink. Alternatively, or additionally, the second UE 606 may transmit, and the first UE 604 may receive, a second communication using the updated sidelink.

As shown by reference number 680, portions of the wireless communication process described by the example 600 may iteratively repeat. As one example, the first UE 604 and/or the second UE 606 may move from a first location within a first coverage zone to a second location within a second coverage zone. In some aspects, and based at least in part on changing locations, the first UE 604 and/or the second UE 606 may receive an additional transmission that indicates a set of location-based delta sidelink configuration parameters that are relevant to the second location. To illustrate, different WCDs (e.g., different RSUs and/or different network nodes) may manage communicating a respective set of location-based delta configuration parameters for different coverage zones. That is, each coverage zone may be linked to a respective WCD 602 (e.g., a respective RSU) that transmits an indication of the respective set of location-based delta configuration parameters for that coverage zone. Based at least in part on mobility, the first UE 604 and/or the second UE 606 may travel from a first coverage zone to a second coverage zone and, consequently, may receive a respective set of location-based delta configuration parameters (e.g., that are relevant to a current coverage zone and/or current location of the UE) at different locations. Accordingly, the first UE 604 and/or the second UE 606 may update the sidelink using the respective set of location-based delta configuration parameters.

Alternatively, or additionally, the first UE 604 and/or the second UE 606 may select the set of location-based delta sidelink configuration parameters that are relevant to the second location from a list of multiple sets of location-based delta sidelink configuration parameters (e.g., using a center location of the set of location-based delta sidelink configuration parameters and/or a current sidelink location). To aid the first UE 604 and/or the second UE 606 in tracking and/or managing the different sets of location-based delta configuration parameters, a WCD 60*s* may indicate a respective tracking number for each set of location-based delta configuration parameters, such as a timestamp and/or a sequence number. As one example, the WCD 602 may indicate the respective tracking number in a MAC CE and/or configuration message carried by a transmission. In some aspects, the first UE 604 and/or the second UE 606 may use the timestamp to resolve selection between retransmitted and/or repeated MAC-CEs. Alternatively, or additionally, the first UE 604 and/or the second UE 606 may use a sequence number to resolve missing transmissions (e.g., a missing MAC CE with a missing sequence number). Accordingly, the first UE 604 and/or the second UE 606 may manage selection of a set of location-based delta configuration parameters (e.g., from one or more sets of location-based delta configuration parameters that were received prior to moving to a current location) using a tracking number and/or based at least in part on moving locations.

In combination, a set of reference sidelink configuration parameters and a set of location-based delta sidelink configuration parameters may provide a more efficient sidelink configuration and/or a more efficient sidelink communication configuration relative to using factory-installed parameters and/or network node configured parameters that are not tailored to an operating location and/or a current channel condition (e.g., "one size fits all" parameters). A more efficient sidelink configuration and/or a more efficient sidelink communication configuration may result in reduced air interface resource consumption, increased data throughput, and/or reduced data transfer latencies. Alternatively, or additionally, using the set of reference sidelink configuration parameters in combination with the set of location-based delta sidelink configuration parameters may improve a signal quality (e.g., reduced interference, increased power level), resulting in decreased recovery errors and/or an increased operating range.

As indicated above, FIG. 6 is provided as an example. Other examples may differ from what is described with regard to FIG. 6.

Figure 7:
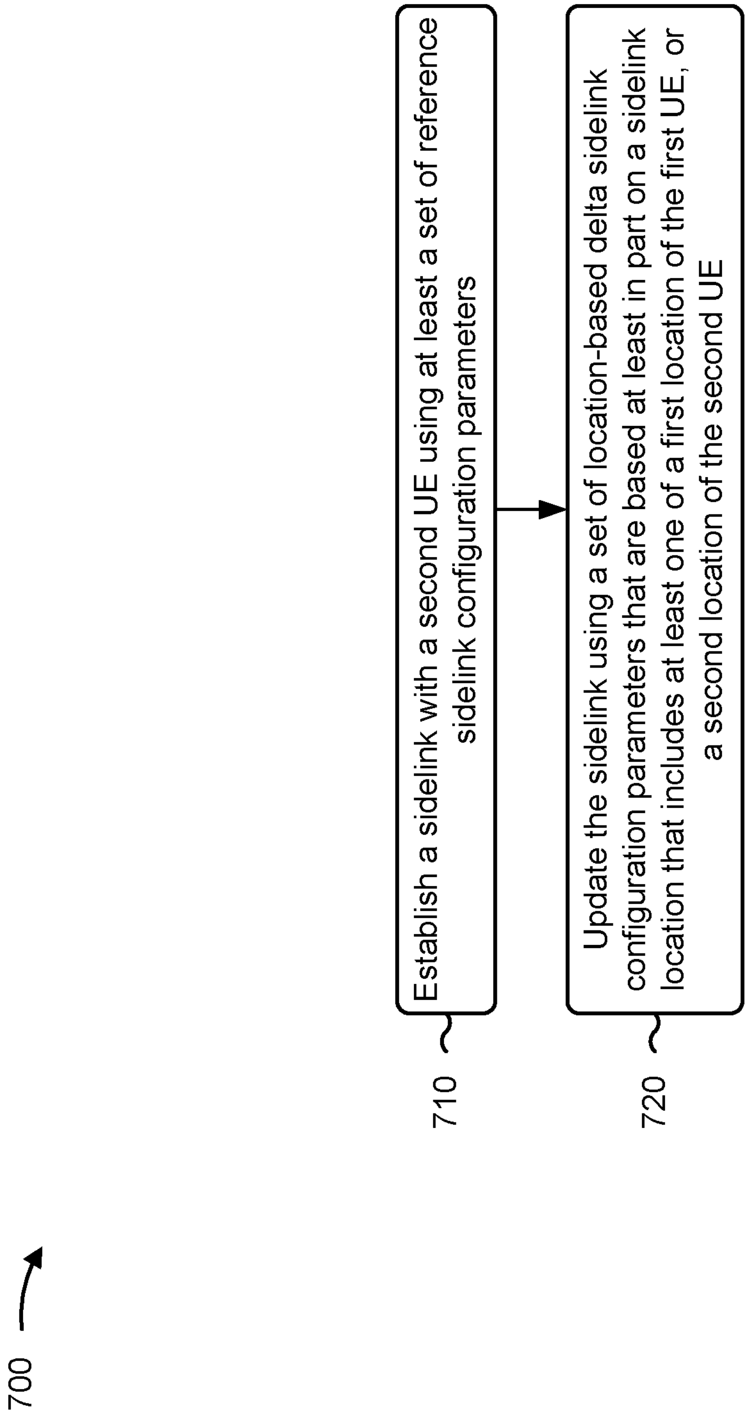
FIG. 7 is a diagram illustrating an example process performed, for example, at a UE or an apparatus of a UE, in accordance with the present disclosure.

FIG. 7 is a diagram illustrating an example process 700 performed, for example, at a UE or an apparatus of a UE, in accordance with the present disclosure. Example process 700 is an example where the apparatus or the UE (e.g., UE 120) performs operations associated with location-based sidelink configuration.

As shown in FIG. 7, in some aspects, process 700 may include establishing a sidelink with a second UE using at least a set of reference sidelink configuration parameters (block 710). For example, the UE (e.g., using communication manager 806, depicted in FIG. 8) may establish a sidelink with a second UE using at least a set of reference sidelink configuration parameters, as described above.

As further shown in FIG. 7, in some aspects, process 700 may include updating the sidelink using a set of location-based delta sidelink configuration parameters that are based at least in part on a sidelink location that includes at least one of: a first location of the first UE, or a second location of the second UE (block 720). For example, the UE (e.g., using communication manager 806, depicted in FIG. 8) may update the sidelink using a set of location-based delta sidelink configuration parameters that are based at least in part on a sidelink location that includes at least one of: a first location of the first UE, or a second location of the second UE, as described above.

Process 700 may include additional aspects, such as any single aspect or any combination of aspects described below and/or in connection with one or more other processes described elsewhere herein.

In a first aspect, process 700 includes receiving multiple sets of location-based delta sidelink configuration parameters in a configuration message, each set of location-based delta sidelink configuration parameters in the multiple sets of location-based delta sidelink configuration parameters is linked to a respective coverage zone, and selecting the set of location-based delta sidelink configuration parameters from the multiple sets of location-based delta sidelink configuration parameters using the sidelink location.

In a second aspect, the respective coverage zone is referenced by a respective center location.

In a third aspect, the respective center location is formatted using one or more Cartesian coordinates.

In a fourth aspect, the configuration message is included in a MAC CE.

In a fifth aspect, each respective coverage zone linked to each respective set of location-based delta sidelink configuration parameters has a same size.

In a sixth aspect, the configuration message indicates one or more characteristics for each respective coverage zone.

In a seventh aspect, the one or more characteristics comprise at least one of a center location, a size, or a shape.

In an eighth aspect, selecting the set of location-based delta sidelink configuration parameters includes comparing a respective center location of each respective coverage zone to the sidelink location, and selecting, as the set of location-based delta sidelink configuration parameters, a set of location-based delta sidelink configuration parameters in the multiple sets of location-based delta sidelink configuration parameters that is linked to the respective coverage zone that is closest to the sidelink location.

In a ninth aspect, process 700 includes receiving an indication of a center location for a service area, and each respective coverage zone is based at least in part on a Voronoi cell of the service area.

In a tenth aspect, process 700 includes reusing a respective connectionless groupcast NACK feedback zone as the respective coverage zone.

In an eleventh aspect, process 700 includes receiving one or more RRC parameters that indicate a configuration of the respective connectionless groupcast NACK feedback zone.

In a twelfth aspect, process 700 includes receiving one or more sets of reference location-based delta sidelink configuration parameters in a configuration message, each set of reference location-based delta sidelink configuration parameters in the one or more sets of reference location-based delta sidelink configuration parameters is different from one another, receiving one or more sets of differential location-based delta sidelink configuration parameters in the configuration message, and obtaining the set of location-based delta sidelink configuration parameters using a particular set of reference location-based delta sidelink configuration parameters of the one or more sets of reference location-based delta sidelink configuration, and a particular set of differential location-based delta sidelink configuration parameters of the one or more sets of differential location-based delta sidelink configuration parameters.

In a thirteenth aspect, the configuration message indicates a reference delta configuration index that is linked to the particular set of differential location-based delta sidelink configuration parameters and is assigned to the particular set of reference location-based delta sidelink configuration parameters.

In a fourteenth aspect, obtaining the set of location-based delta sidelink configuration parameters includes selecting the particular set of differential location-based delta sidelink configuration parameters based at least in part on a coverage area linked to the particular set of differential location-based delta sidelink configuration parameters and the sidelink location, and selecting the particular set of reference location-based delta sidelink configuration parameters based at least in part on a delta configuration index that is linking to the particular set of differential location-based delta sidelink configuration parameters, and assigning to the particular set of differential location-based delta sidelink configuration parameters.

In a fifteenth aspect, the set of location-based delta sidelink configuration parameters indicates an update to the set of reference sidelink configuration parameters.

In a sixteenth aspect, process 700 includes receiving, in a configuration message, an indication of multiple sets of location-based delta sidelink configuration parameters, the multiple sets of location-based delta sidelink configuration parameters including the set of location-based delta sidelink configuration parameters, each set of location-based delta sidelink configuration parameters in the multiple sets of location-based delta sidelink configuration parameters is uniquely different from one another, and the configuration message indicates at least two coverage zones the set of location-based delta sidelink configuration parameters.

In a seventeenth aspect, at least one of the set of location-based delta sidelink configuration parameters, or the set of reference sidelink configuration parameters is RRC configured.

In an eighteenth aspect, process 700 includes receiving an indication of the set of location-based delta sidelink configuration parameters in application layer data.

In a nineteenth aspect, receiving the indication includes receiving the indication from an RSU.

In a twentieth aspect, process 700 includes receiving a MAC CE that indicates a coverage zone that satisfies a distance condition for the sidelink location, and selecting the set of location-based delta sidelink configuration parameters from application layer data that is carried with the MAC CE, the selecting being based at least in part on the coverage zone indicated by the MAC CE satisfying the distance condition.

In a twenty-first aspect, the MAC CE is a first MAC CE carried by a first transmission, the coverage zone is a first coverage zone, the application layer data is first application layer data, and process 700 includes receiving a second MAC CE that is carried by a second transmission, the second MAC CE indicating a second coverage zone that satisfies the distance condition, the second transmission carrying second application layer data, calculating a first signal strength metric using the first transmission, calculating a second signal strength metric using the second transmission, and selecting the set of location-based delta sidelink configuration parameters from the first application layer data based at least in part on the first signal strength metric being higher than the second signal strength metric.

In a twenty-second aspect, process 700 includes receiving multiple transmissions, each transmission of the multiple transmissions originating from a respective transmission source and indicating a respective origination location, selecting a particular transmission from the multiple transmissions that indicates the respective origination location that is closest to the sidelink location, and obtaining the set of location-based delta sidelink configuration parameters from application layer data carried by the particular transmission.

In a twenty-third aspect, each transmission of the multiple transmissions indicates the respective origination location in a respective MAC CE.

In a twenty-fourth aspect, process 700 includes receiving multiple transmissions, each transmission of the multiple transmissions originating from a respective transmission source and indicating a respective priority, selecting a particular transmission, from the multiple transmissions, that indicates a highest priority, and obtaining the set of location-based delta sidelink configuration parameters from application layer data carried by the particular transmission.

In a twenty-fifth aspect, the set of location-based delta sidelink configuration parameters is a first set of location-based delta sidelink configuration parameters that is associated with a current coverage zone, and process 700 includes receiving a second set of location-based delta sidelink configuration parameters that is associated with a second coverage zone, moving from a first location within the current coverage zone to a second location within the second coverage zone, and updating the sidelink using the second set of location-based delta sidelink configuration parameters based at least in part on moving to the second location.

In a twenty-sixth aspect, process 700 includes receiving, with the set of location-based delta sidelink configuration parameters, a tracking number, and managing application of the set of location-based delta sidelink parameters based at least in part on the tracking number.

In a twenty-seventh aspect, the tracking number includes at least one of a sequence number, or a timestamp.

In a twenty-eighth aspect, the sidelink is a first sidelink, and process 700 includes receiving the set of location-based delta sidelink configuration parameters via a second sidelink.

In a twenty-ninth aspect, the second sidelink is between the first UE and at least one of: a third UE, or an RSU.

In a thirtieth aspect, process 700 includes receiving the set of location-based delta sidelink configuration parameters via the sidelink with the second UE.

In a thirty-first aspect, process 700 includes receiving the set of location-based delta sidelink configuration parameters via an access link with a network node.

In a thirty-second aspect, the sidelink is a first sidelink, and process 700 includes establishing at least a second sidelink with a third UE; and updating the at least second sidelink using the set of location-based delta sidelink configuration parameters.

In a thirty-third aspect, process 700 includes communicating with the second UE using the updated sidelink.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
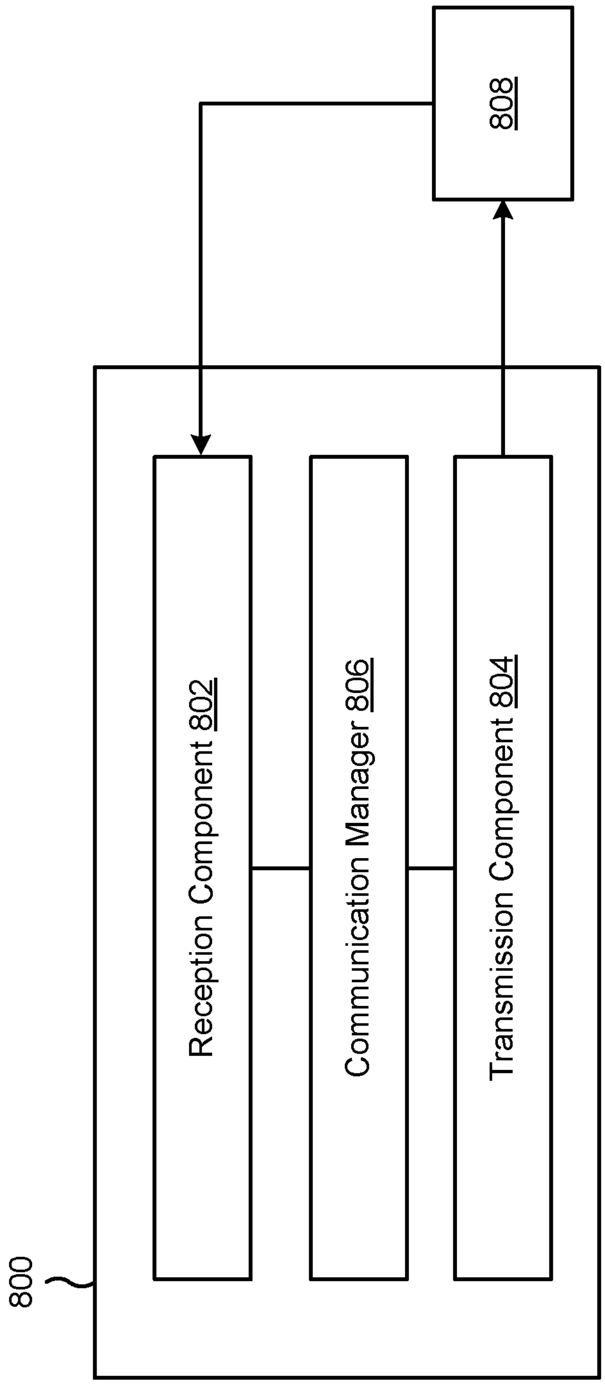
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 5-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The communication manager 806 may establish a sidelink with a second UE using at least a set of reference sidelink configuration parameters. The communication manager 806 may update the sidelink using a set of location-based delta sidelink configuration parameters that are based at least in part on a sidelink location that includes at least one of a first location of the first UE, or a second location of the second UE.

The reception component 802 may receive multiple sets of location-based delta sidelink configuration parameters in a configuration message, and each set of location-based delta sidelink configuration parameters in the multiple sets of location-based delta sidelink configuration parameters is linked to a respective coverage zone. In some aspects, the communication manager 806 may select the set of location-based delta sidelink configuration parameters from the multiple sets of location-based delta sidelink configuration parameters using the sidelink location. Alternatively, or additionally, the reception component 802 may receive an indication of a center location for a service area and each respective coverage zone is based at least in part on a Voronoi cell of the service area.

The communication manager 806 may reuse a respective connectionless groupcast NACK feedback zone as the respective coverage zone. In some aspects, the reception component 802 may receive one or more RRC parameters that indicate a configuration of the respective connectionless groupcast NACK feedback zone.

The reception component 802 may receive one or more sets of reference location-based delta sidelink configuration parameters in a configuration message, and each set of reference location-based delta sidelink configuration parameters in the one or more sets of reference location-based delta sidelink configuration parameters is different from one another. Alternatively, or additionally, the reception component 802 may receive one or more sets of differential location-based delta sidelink configuration parameters in the configuration message. In some aspects, the reception component 802 may obtain the set of location-based delta sidelink configuration parameters using a particular set of reference location-based delta sidelink configuration parameters of the one or more sets of reference location-based delta sidelink configuration, and a particular set of differential location-based delta sidelink configuration parameters of the one or more sets of differential location-based delta sidelink configuration parameters.

The reception component 802 may receive, in a configuration message, an indication of multiple sets of location-based delta sidelink configuration parameters, the multiple sets of location-based delta sidelink configuration parameters including the set of location-based delta sidelink configuration parameters, each set of location-based delta sidelink configuration parameters in the multiple sets of location-based delta sidelink configuration parameters is uniquely different from one another, and the configuration message indicates at least two coverage zones the set of location-based delta sidelink configuration parameters. Alternatively, or additionally, the reception component 802 may receive an indication of the set of location-based delta sidelink configuration parameters in application layer data.

The reception component 802 may receive a MAC CE that indicates a coverage zone that satisfies a distance condition for the sidelink location. In some aspects, the communication manager 806 may select the set of location-based delta sidelink configuration parameters from application layer data that is carried with the MAC CE, the selecting being based at least in part on the coverage zone indicated by the MAC CE satisfying the distance condition.

The reception component 802 may receive multiple transmissions, each transmission of the multiple transmissions originating from a respective transmission source and indicating a respective origination location. In some aspects, the communication manager 806 may select a particular transmission from the multiple transmissions that indicates the respective origination location that is closest to the sidelink location. Alternatively, or additionally, the communication manager 806 may obtain the set of location-based delta sidelink configuration parameters from application layer data carried by the particular transmission.

The reception component 802 may receive multiple transmissions, each transmission of the multiple transmissions originating from a respective transmission source and indicating a respective priority. In some aspects, the communication manager 806 may select a particular transmission, from the multiple transmissions, that indicates a highest priority. Alternatively, or additionally, the communication manager 806 may obtain the set of location-based delta sidelink configuration parameters from application layer data carried by the particular transmission.

The reception component 802 may receive, with the set of location-based delta sidelink configuration parameters, a tracking number. In some aspects, the communication manager 806 may manage application of the set of location-based delta sidelink parameters based at least in part on the tracking number.

In some aspects, the sidelink is a first sidelink, and the reception component 802 may receive the set of location-based delta sidelink configuration parameters via a second sidelink that is different from the first sidelink. In some aspects, the second sidelink is between the first UE and at least one of: a third UE, or an RSU. Alternatively, or additionally, the reception component 802 may receive the set of location-based delta sidelink configuration parameters via the sidelink with the second UE. In some aspects, the reception component 802 may receive the set of location-based delta sidelink configuration parameters via an access link with a network node.

In some aspects, the sidelink is a first sidelink, and process 800 includes establishing at least a second sidelink with a third UE; and updating the at least second sidelink using the set of location-based delta sidelink configuration parameters.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first user equipment (UE), comprising: establishing a sidelink with a second UE using at least a set of reference sidelink configuration parameters; and updating the sidelink using a set of location-based delta sidelink configuration parameters that are based at least in part on a sidelink location that includes at least one of: a first location of the first UE, or a second location of the second UE.

Aspect 2: The method of Aspect 1, further comprising: receiving multiple sets of location-based delta sidelink configuration parameters in a configuration message, wherein each set of location-based delta sidelink configuration parameters in the multiple sets of location-based delta sidelink configuration parameters is linked to a respective coverage zone; and selecting the set of location-based delta sidelink configuration parameters from the multiple sets of location-based delta sidelink configuration parameters using the sidelink location.

Aspect 3: The method of Aspect 2, wherein the respective coverage zone is referenced by a respective center location.

Aspect 4: The method of Aspect 3, wherein the respective center location is formatted using one or more Cartesian coordinates.

Aspect 5: The method of Aspect 2, wherein the configuration message is included in a medium access control (MAC) control element (CE).

Aspect 6: The method of Aspect 2, wherein each respective coverage zone linked to each respective set of location-based delta sidelink configuration parameters has a same size.

Aspect 7: The method of Aspect 2, wherein the configuration message indicates one or more characteristics for each respective coverage zone.

Aspect 8: The method of Aspect 7, wherein the one or more characteristics comprise at least one of: a center location, a size, or a shape.

Aspect 9: The method of Aspect 2, wherein selecting the set of location-based delta sidelink configuration parameters comprises: comparing a respective center location of each respective coverage zone to the sidelink location; and selecting, as the set of location-based delta sidelink configuration parameters, a set of location-based delta sidelink configuration parameters in the multiple sets of location-based delta sidelink configuration parameters that is linked to the respective coverage zone that is closest to the sidelink location.

Aspect 10: The method of Aspect 2, further comprising: receiving an indication of a center location for a service area, wherein each respective coverage zone is based at least in part on a Voronoi cell of the service area.

Aspect 11: The method of Aspect 2, further comprising: reusing a respective connectionless groupcast negative acknowledgement (NACK) feedback zone as the respective coverage zone.

Aspect 12: The method of Aspect 11, further comprising: receiving one or more radio resource control (RRC) parameters that indicate a configuration of the respective connectionless groupcast NACK feedback zone.

Aspect 13: The method of any of Aspects 1-12, further comprising: receiving one or more sets of reference location-based delta sidelink configuration parameters in a configuration message, wherein each set of reference location-based delta sidelink configuration parameters in the one or more sets of reference location-based delta sidelink configuration parameters is different from one another; receiving one or more sets of differential location-based delta sidelink configuration parameters in the configuration message; and obtaining the set of location-based delta sidelink configuration parameters using: a particular set of reference location-based delta sidelink configuration parameters of the one or more sets of reference location-based delta sidelink configuration, and a particular set of differential location-based delta sidelink configuration parameters of the one or more sets of differential location-based delta sidelink configuration parameters.

Aspect 14: The method of Aspect 13, wherein the configuration message indicates a reference delta configuration index that is linked to the particular set of differential location-based delta sidelink configuration parameters and is assigned to the particular set of reference location-based delta sidelink configuration parameters.

Aspect 15: The method of Aspect 13, wherein obtaining the set of location-based delta sidelink configuration parameters comprises: selecting the particular set of differential location-based delta sidelink configuration parameters based at least in part on a coverage area linked to the particular set of differential location-based delta sidelink configuration parameters and the sidelink location; and selecting the particular set of reference location-based delta sidelink configuration parameters based at least in part on a delta configuration index that is: linked to the particular set of differential location-based delta sidelink configuration parameters, and assigned to the particular set of differential location-based delta sidelink configuration parameters.

Aspect 16: The method of any of Aspects 1-15, wherein the set of location-based delta sidelink configuration parameters indicates an update to the set of reference sidelink configuration parameters.

Aspect 17: The method of any of Aspects 1-16, further comprising: receiving, in a configuration message, an indication of multiple sets of location-based delta sidelink configuration parameters, the multiple sets of location-based delta sidelink configuration parameters including the set of location-based delta sidelink configuration parameters, wherein each set of location-based delta sidelink configuration parameters in the multiple sets of location-based delta sidelink configuration parameters is uniquely different from one another, and wherein the configuration message indicates at least two coverage zones the set of location-based delta sidelink configuration parameters.

Aspect 18: The method of any of Aspects 1-17, wherein at least one of the set of location-based delta sidelink configuration parameters, or the set of reference sidelink configuration parameters is radio resource control (RRC) configured.

Aspect 19: The method of any of Aspects 1-18, further comprising: receiving an indication of the set of location-based delta sidelink configuration parameters in application layer data.

Aspect 20: The method of Aspect 19, wherein receiving the indication comprises: receiving the indication from a roadside unit (RSU).

Aspect 21: The method of any of Aspects 1-20, further comprising: receiving a medium access control (MAC) control element (CE) that indicates a coverage zone that satisfies a distance condition for the sidelink location; and selecting the set of location-based delta sidelink configuration parameters from application layer data that is carried with the MAC CE, the selecting being based at least in part on the coverage zone indicated by the MAC CE satisfying the distance condition.

Aspect 22: The method of Aspect 21, wherein the MAC CE is a first MAC CE carried by a first transmission, wherein the coverage zone is a first coverage zone, wherein the application layer data is first application layer data, and wherein the method further comprises: receiving a second MAC CE that is carried by a second transmission, the second MAC CE indicating a second coverage zone that satisfies the distance condition, the second transmission carrying second application layer data; calculating a first signal strength metric using the first transmission; calculating a second signal strength metric using the second transmission; and selecting the set of location-based delta sidelink configuration parameters from the first application layer data based at least in part on the first signal strength metric being higher than the second signal strength metric.

Aspect 23: The method of any of Aspects 1-22, further comprising: receiving multiple transmissions, each transmission of the multiple transmissions originating from a respective transmission source and indicating a respective origination location; selecting a particular transmission from the multiple transmissions that indicates the respective origination location that is closest to the sidelink location; and obtaining the set of location-based delta sidelink configuration parameters from application layer data carried by the particular transmission.

Aspect 24: The method of Aspect 23, wherein each transmission of the multiple transmissions indicates the respective origination location in a respective medium access control (MAC) control element (CE).

Aspect 25: The method of any of Aspects 1-24, further comprising: receiving multiple transmissions, each transmission of the multiple transmissions originating from a respective transmission source and indicating a respective priority; selecting a particular transmission, from the multiple transmissions, that indicates a highest priority; and obtaining the set of location-based delta sidelink configuration parameters from application layer data carried by the particular transmission.

Aspect 26: The method of any of Aspects 1-25, wherein the set of location-based delta sidelink configuration parameters is a first set of location-based delta sidelink configuration parameters that is associated with a current coverage zone, and wherein the method further comprises: receiving a second set of location-based delta sidelink configuration parameters that is associated with a second coverage zone; moving from a first location within the current coverage zone to a second location within the second coverage zone; and updating the sidelink using the second set of location-based delta sidelink configuration parameters based at least in part on moving to the second location.

Aspect 27: The method of any of Aspects 1-26 further comprising: receiving, with the set of location-based delta sidelink configuration parameters, a tracking number; and managing application of the set of location-based delta sidelink parameters based at least in part on the tracking number.

Aspect 28: The method of Aspect 27, wherein the tracking number comprises at least one of: a sequence number, or a timestamp.

Aspect 29: The method of any of Aspects 1-28, wherein the sidelink is a first sidelink, and the method further comprises: receiving the set of location-based delta sidelink configuration parameters via a second sidelink.

Aspect 30: The method of Aspect 29, wherein the second sidelink is between the first UE and at least one of: a third UE, or a roadside unit (RSU).

Aspect 29: The method of any of Aspects 1-28, further comprising: receiving the set of location-based delta sidelink configuration parameters via the sidelink with the second UE.

Aspect 31: The method of any of Aspects 1-28, further comprising: receiving the set of location-based delta sidelink configuration parameters via an access link with a network node.

Aspect 32: The method of any of Aspects 1-31, wherein the sidelink is a first sidelink, and the method further comprises: establishing at least a second sidelink with a third UE; and updating the at least second sidelink using the set of location-based delta sidelink configuration parameters.

Aspect 33: The method of any of Aspects 1-32, further comprising: communicating with the second UE using the updated sidelink.

Aspect 34: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-33.

Aspect 35: An apparatus for wireless communication at a device, the apparatus comprising one or more memories and one or more processors coupled to the one or more memories, the one or more processors configured to cause the device to perform the method of one or more of Aspects 1-33.

Aspect 36: An apparatus for wireless communication, the apparatus comprising at least one means for performing the method of one or more of Aspects 1-33.

Aspect 37: A non-transitory computer-readable medium storing code for wireless communication, the code comprising instructions executable by one or more processors to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

Aspect 39: A device for wireless communication, the device comprising a processing system that includes one or more processors and one or more memories coupled with the one or more processors, the processing system configured to cause the device to perform the method of one or more of Aspects 1-33.

Aspect 40: An apparatus for wireless communication at a device, the apparatus comprising one or more memories and one or more processors coupled to the one or more memories, the one or more processors individually or collectively configured to cause the device to perform the method of one or more of Aspects 1-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and at least one of software or firmware. “Software” shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a “processor” is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, “satisfying a threshold” may, depending on the context, refer to a value being greater than the threshold, greater than or equal to the threshold, less than the threshold, less than or equal to the threshold, equal to the threshold, or not equal to the threshold, among other examples.

As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” and similar terms are intended to be open-ended terms that do not limit an element that they modify (for example, an element “having” A may also have B). Further, the phrase “based on” is intended to mean “based on or otherwise in association with” unless explicitly stated otherwise. Also, as used herein, the term “or” is intended to be inclusive when used in a series and may be used interchangeably with “and/or,” unless explicitly stated otherwise (for example, if used in combination with “either” or “only one of”). It should be understood that “one or more” is equivalent to “at least one.”

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A first user equipment (UE), comprising:

one or more antennas; and a processing system, coupled with the one or more antennas, that includes one or more processors and one or more memories that store code for the one or more processors, the processing system configured to cause the first UE to:

establish a sidelink with a second UE using at least a set of reference sidelink configuration parameters;

receive a first medium access control (MAC) control element (CE) that is carried by a first transmission, the first MAC CE indicating a first coverage zone that satisfies a distance condition for a sidelink location, and the first transmission carrying first application layer data, wherein the sidelink location includes at least one of:

a first location of the first UE, or a second location of the second UE;

receive a second MAC CE that is carried by a second transmission, the second MAC CE indicating a second coverage zone that satisfies the distance condition for the sidelink location, and the second transmission carrying second application layer data;

calculate a first signal strength metric using the first transmission;

calculate a second signal strength metric using the second transmission;

select a set of location-based delta sidelink configuration parameters from the first application layer data or from the second application layer data based at least in part on the sidelink location and on one or more of:

the first coverage zone or the second coverage zone satisfying the distance condition, or whether the first signal strength metric is higher than the second signal strength metric; and update the sidelink using the set of location-based delta sidelink configuration parameters.

2. The first UE of claim 1, wherein;

at least one of the first MAC CE and the second MAC CE includes multiple sets of location-based delta sidelink configuration parameters in a configuration message, each set of location-based delta sidelink configuration parameters in the multiple sets of location-based delta sidelink configuration parameters is linked to a respective coverage zone, and the set of location-based delta sidelink configuration parameters is selected from the multiple sets of location-based delta sidelink configuration parameters using the sidelink location.

3. The first UE of claim 2, wherein, to select the set of location-based delta sidelink configuration parameters, the processing system is further configured to cause the first UE to:

compare a respective center location of the respective coverage zone to the sidelink location; and select, as the set of location-based delta sidelink configuration parameters, a set of location-based delta sidelink configuration parameters in the multiple sets of location-based delta sidelink configuration parameters that is linked to the respective coverage zone that is closest to the sidelink location.

4. The first UE of claim 1, wherein at least one of the first MAC CE or the second MAC CE includes multiple sets of location-based delta sidelink configuration parameters in a configuration message, the multiple sets of location-based delta sidelink configuration parameters include the selected set of location-based delta sidelink configuration parameters, each set of location-based delta sidelink configuration parameters in the multiple sets of location-based delta sidelink configuration parameters is uniquely different from one another, and the configuration message indicates at least two coverage zones the set of location-based delta sidelink configuration parameters.

5. The first UE of claim 1, wherein the processing system is further configured to cause the first UE to:

receive an indication of the set of location-based delta sidelink configuration parameters in the first application layer data or in the second application layer data.

6. The first UE of claim 1, wherein each of the first transmission and the second transmission originates from a respective transmission source and indicates a respective origination location, and wherein the processing system is further configured to cause the first UE to:

select a particular transmission, from the first transmission and the second transmission, that indicates the respective origination location that is closest to the sidelink location; and obtain the set of location-based delta sidelink configuration parameters from application layer data carried by the particular transmission.

7. The first UE of claim 1, wherein each of the first transmission and the second transmission originates from a respective transmission source and indicates a respective priority, and wherein the processing system is further configured to cause the first UE to:

select a particular transmission, from the first transmission and the second transmission, that indicates a highest priority; and obtain the set of location-based delta sidelink configuration parameters from application layer data carried by the particular transmission.

8. The UE of claim 1, wherein the set of location-based delta sidelink configuration parameters is selected from the first application layer data based at least in part on the first signal strength metric being higher than the second signal strength metric.

9. The first UE of claim 1, wherein the set of location-based delta sidelink configuration parameters is a first set of location-based delta sidelink configuration parameters that is associated with a current coverage zone, and wherein the processing system is further configured to cause the first UE to:

receive a second set of location-based delta sidelink configuration parameters that is associated with a third coverage zone;

move from a third location within the current coverage zone to a fourth location within the third coverage zone; and update the sidelink using the second set of location-based delta sidelink configuration parameters based at least in part on moving to the fourth location.

10. A method of wireless communication performed by a first user equipment (UE), comprising:

establishing a sidelink with a second UE using at least a set of reference sidelink configuration parameters;

receiving a first medium access control (MAC) control element (CE) that is carried by a first transmission, the first MAC CE indicating a first coverage zone that satisfies a distance condition for a sidelink location, and the first transmission carrying first application layer data, wherein the sidelink location includes at least one of:

a first location of the first UE, or a second location of the second UE;

receiving a second MAC CE that is carried by a second transmission, the second MAC CE indicating a second coverage zone that satisfies the distance condition for the sidelink location, and the second transmission carrying second application layer data;

calculating a first signal strength metric using the first transmission;

calculating a second signal strength metric using the second transmission;

selecting a set of location-based delta sidelink configuration parameters from the first application layer data or from the second application layer data based at least in part on the sidelink location and on one or more of:

the first coverage zone or the second coverage zone satisfying the distance condition, or whether the first signal strength metric is higher than the second signal strength metric; and updating the sidelink using the set of location-based delta sidelink configuration parameters.

11. The method of claim 10, wherein:

at least one of the first MAC CE and the second MAC CE includes multiple sets of location-based delta sidelink configuration parameters in a configuration message, each set of location-based delta sidelink configuration parameters in the multiple sets of location-based delta sidelink configuration parameters is linked to a respective coverage zone, and the set of location-based delta sidelink configuration parameters is selected from the multiple sets of location-based delta sidelink configuration parameters using the sidelink location.

12. The method of claim 11, wherein selecting the set of location-based delta sidelink configuration parameters comprises:

comparing a respective center location of the respective coverage zone to the sidelink location; and selecting, as the set of location-based delta sidelink configuration parameters, a set of location-based delta sidelink configuration parameters in the multiple sets of location-based delta sidelink configuration parameters that is linked to the respective coverage zone that is closest to the sidelink location.

13. The method of claim 10, wherein at least one of the first MAC CE and the second MAC CE includes multiple sets of location-based delta sidelink configuration parameters in a configuration message, the multiple sets of location-based delta sidelink configuration parameters including the set of location-based delta sidelink configuration parameters, wherein each set of location-based delta sidelink configuration parameters in the multiple sets of location-based delta sidelink configuration parameters is uniquely different from one another, and wherein the configuration message indicates at least two coverage zones the set of location-based delta sidelink configuration parameters.

14. The method of claim 10, wherein the set of location-based delta sidelink configuration parameters is selected from the first application layer data based at least in part on the first signal strength metric being higher than the second signal strength metric.

15. The method of claim 10, wherein the set of location-based delta sidelink configuration parameters is a first set of location-based delta sidelink configuration parameters that is associated with a current coverage zone, and wherein the method further comprises:

receiving a second set of location-based delta sidelink configuration parameters that is associated with a third coverage zone;

moving from a third location within the current coverage zone to a fourth location within the third coverage zone; and updating the sidelink using the second set of location-based delta sidelink configuration parameters based at least in part on moving to the fourth location.

16. A non-transitory computer-readable medium storing a set of instructions for wireless communication, the set of instructions comprising:

one or more instructions that, when executed by one or more processors of a first user equipment (UE), cause the first UE to:

establish a sidelink with a second UE using at least a set of reference sidelink configuration parameters;

receive a first medium access control (MAC) control element (CE) that is carried by a first transmission, the first MAC CE indicating a first coverage zone that satisfies a distance condition for a sidelink location, and the first transmission carrying first application layer data, wherein the sidelink location includes at least one of:

a first location of the first UE, or a second location of the second UE;

receive a second MAC CE that is carried by a second transmission, the second MAC CE indicating a second coverage zone that satisfies the distance condition for the sidelink location, and the second transmission carrying second application layer data;

calculate a first signal strength metric using the first transmission;

calculate a second signal strength metric using the second transmission;

select a set of location-based delta sidelink configuration parameters from the first application layer data or from the second application layer data based at least in part on the sidelink location and on one or more of:

the first coverage zone or the second coverage zone satisfying the distance condition, or whether the first signal strength metric is higher than the second signal strength metric; and update the sidelink using the set of location-based delta sidelink configuration parameters.

17. The non-transitory computer-readable medium of claim 16, wherein:

at least one of the first MAC CE and the second MAC CE includes multiple sets of location-based delta sidelink configuration parameters in a configuration message, each set of location-based delta sidelink configuration parameters in the multiple sets of location-based delta sidelink configuration parameters is linked to a respective coverage zone, and the set of location-based delta sidelink configuration parameters is selected from the multiple sets of location-based delta sidelink configuration parameters using the sidelink location.

18. The non-transitory computer-readable medium of claim 16, wherein the one or more instructions further cause the first UE to:

receive one or more sets of reference location-based delta sidelink configuration parameters in a configuration message, wherein each set of reference location-based delta sidelink configuration parameters in the one or more sets of reference location-based delta sidelink configuration parameters is different from one another;

receive one or more sets of differential location-based delta sidelink configuration parameters in the configuration message; and obtain the set of location-based delta sidelink configuration parameters using:

a particular set of reference location-based delta sidelink configuration parameters of the one or more sets of reference location-based delta sidelink configuration, and a particular set of differential location-based delta sidelink configuration parameters of the one or more sets of differential location-based delta sidelink configuration parameters.

19. The non-transitory computer-readable medium of claim 18, wherein the configuration message indicates a reference delta configuration index that is linked to the particular set of differential location-based delta sidelink configuration parameters and is assigned to the particular set of reference location-based delta sidelink configuration parameters.

20. The non-transitory computer-readable medium of claim 19, wherein the one or more instructions, that cause the first UE to obtain the set of location-based delta sidelink configuration parameters, cause the first UE to:

select the particular set of differential location-based delta sidelink configuration parameters based at least in part on a coverage area linked to the particular set of differential location-based delta sidelink configuration parameters and the sidelink location; and select the particular set of reference location-based delta sidelink configuration parameters based at least in part on a delta configuration index that is:

linked to the particular set of differential location-based delta sidelink configuration parameters, and assigned to the particular set of differential location-based delta sidelink configuration parameters.

* * * * *